United States Patent [19]
Morlock

[11] Patent Number: 6,166,347
[45] Date of Patent: Dec. 26, 2000

[54] METHOD AND SYSTEM FOR WELDING STEEL RAILS

[75] Inventor: Michael J. Morlock, Chesterland, Ohio

[73] Assignee: Lincoln Global, Inc., Monterey Park, Calif.

[21] Appl. No.: 09/354,423

[22] Filed: Jul. 16, 1999

[51] Int. Cl.$^7$ .................................................. B23K 9/09
[52] U.S. Cl. ................ 219/54; 219/125.12; 219/137 PS; 238/164
[58] Field of Search .................................. 219/54, 137 R, 219/137 PS, 125.12, 74, 125.1, 73; 238/164

[56] References Cited

U.S. PATENT DOCUMENTS

| | | |
|---|---|---|
| 3,192,356 | 6/1965 | Schrubsall . |
| 3,308,266 | 3/1967 | Adams . |
| 4,187,410 | 2/1980 | Eroshkin et al. . |
| 4,429,207 | 1/1984 | Devletian . |
| 4,686,341 | 8/1987 | Nomura et al. . |
| 4,841,116 | 6/1989 | Kimura et al. . |
| 5,175,405 | 12/1992 | Karimine . |
| 5,605,283 | 2/1997 | Lahnsteiner et al. . |
| 5,773,779 | 6/1998 | Morlock . |
| 5,877,468 | 3/1999 | Morlock . |

FOREIGN PATENT DOCUMENTS

| | | |
|---|---|---|
| 0 545 336 | 6/1993 | European Pat. Off. . |
| 2 703 701 | 10/1994 | France . |
| 437707 | 11/1926 | Germany . |
| 1191922 | 4/1965 | Germany . |
| 678 538 | 9/1991 | Switzerland . |
| 87/01982 | 4/1987 | WIPO . |

*Primary Examiner*—Clifford C. Shaw
*Attorney, Agent, or Firm*—Vickers, Daniels & Young

[57] ABSTRACT

A method for gas shielded arc welding steel rails spaced from each other to define a transverse gap comprising the steps of positioning an elongated steel barrier plate in the gap at the bottom of the spaced rails and filling the gap above the barrier plate with a molten steel from an advancing filler metal electrode by a gas shielded electric arc welding process initiated by an arc between the electrode and the barrier plate. A root pass is laid using the spray arc welding process, a second layer is laid using the pulsed arc welding process in part and the spray welding process in part, and the remainder of the base gap and the gaps between the webs and heads are filled by the continuous sequential laying of weld beads in the gaps using the pulsed arc process. In filling the head gap, the electrode is first moved along rectangular paths to fill the transition portion of the gap and then along paths having laterally extending sides and catercorner path portions therebetween to fill the full width upper end of the head gap. Movement of the electrode is controlled to provide adjacent, overlapping beads which have first ends extending outwardly of an edge of the head in cantilever relationship thereto and which first ends are vertically thicker than second ends of the beads which are spaced from the first ends in the direction toward the opposite edge of the head.

62 Claims, 18 Drawing Sheets

METHOD AND SYSTEM FOR WELDING STEEL RAILS

The present invention relates to a method and system for welding the spaced ends of steel rails and more particularly welding two spaced railroad rails in the field by an arc welding process.

While the invention will be illustrated and described in detail herein in connection with the welding of railway rails, it will be appreciated that the invention is applicable to the welding of other types of rail such as crane rail and other rail for supporting wheeled vehicles or apparatus.

INCORPORATION BY REFERENCE

The present invention provides improvements in the rail welding methods and systems disclosed in my U.S. Pat. Nos. 5,773,779 and 5,877,468 and my co-pending application Ser. No. 167,463 filed Oct. 7, 1998 and which patents and co-pending application are hereby incorporated herein by reference.

Through the years, a tremendous amount of effort has been devoted to joining spaced railroad rails by some type of butt welding process. Such efforts have generally proven costly and unsuccessful, due to limitations of the processes used, the required time for accomplishing the welding process, the cost of performing the welding process and/or the inability to obtain successful, long-lasting joints. In Schrubsall U.S. Pat. No. 3,192,356, a submerged arc welding process is disclosed as an improvement over the deficiencies in prior gas pressure and electric flash welding techniques, and in Adams U.S. Pat. No. 3,308,266 and Devletian U.S. Pat. No. 4,429,207, the most common electric arc welding process is illustrated wherein the electroslag welding procedure is used to fill the gaps between spaced railroad rails in the field. This process involves filling the gap between the rails with a pool of molten metal covered by an appropriate slag. To prevent the mass of molten metal from flowing from the gap between the rails, side molds and a bottom member are provided that creates a large protrusion of metal below the rails and extending from the actual gap. This prior patent illustrates a modified electroslag welding (ESW) technique which can be used in the field, where the rails cannot be turned upside down for normal welding. The advantage of electroslag welding over the normal thermite technique normally-used today are explained. In this disclosure, the thermite process is revealed to have substantial deficiencies, which are known to result in numerous failures in the field. The Schrubsall, Adams and Devletian patents are incorporated by reference herein to describe the electroslag welding process even though the process has been abandoned as a practical process because of its obvious inefficiencies and inability to obtain uniform and successful welds in the field. Indeed, this process must deal with large masses of molten metal which presents problems in the field.

As an alleged advantage over the electroslag process, the combination of the electroslag technique and the gas shielded arc welding technique is disclosed in Karimine U.S. Pat. No. 5,175,405. This patent employs an automatic welding process for butt welding the spaced ends of railroad rails using a gas shielded arc welding process in combination with an electroslag process. The deficiencies of the normally-used thermite welding technique and the previously attempted enclosed arc welding technique are discussed in detail. As indicated, the thermite technique produces joints which have an unacceptably high failure rate; however, because of the economics, the time and inability to obtain an arc welding process of success, this thermite process is still the process of choice in the field. A disadvantage of the continuous arc welding technique discussed, as in this patent, is the inability to start the arc and the need for starting and stopping the arc as the welding process is performed. To overcome some of these disadvantages, this patent discusses the use of a submerged arc process at the bottom portion of the gap between the rails to start positively the welding process for subsequent and continuous arc welding. Karimine U.S. Pat. No. 5,175,405 is incorporated by reference herein to disclose the deficiencies of the thermite process, the enclosed arc welding technique and the submerged arc technique, all of which have been attempted and have not been successful in the field. The solution suggested by Karimine U.S. Pat. No. 5,175,405 is the use of a gas shielded arc welding technique in combination with an electroslag welding process wherein the gas shielded arc welding technique is used at the base of the gap to overcome the disadvantages of the previous attempts to use total electroslag welding. However, this process of using a gas shielded arc at the bottom of a gap could not be successful in the field due to the fact that there is no technique that will ensure accurate starting and depositing the first layer of the filler metal at the bottom of the gap.

In Lahnsteiner, et al. U.S. Pat. No. 5,605,283, railroad rails are disclosed as being welded together by a multiplicity of beads extending transverse to the longitudinal direction of the rails. The beads ascend from the base of the rails to the heads thereof in transversely parallel and longitudinally overlapping relationship and are laid using an inert gas shielded arc welding process. Three zones of the rails, namely the base, web and head, are distinctly and sequentially welded together, and the process enables the use of different filler materials in the different welding zones. The welding process necessitates delays between the sequential zone welding steps and is therefore undesirably time consuming and expensive.

BACKGROUND OF THE INVENTION

Railroad rails must be installed and repaired by joining ends of the rails while they are in use or assembled for use in the field. The joining process results in a joint between the rails which has a high strength, can be adjusted metallurgically, will not crack and can be economically formed in a very short time. As a criteria for such welding process, the process must be performed in substantially less than 45 minutes or such process will cause a delay or rerouting of train traffic. Two processes are now used for joining the rails in the field. The first process is the thermite technique wherein the spaced rails are surrounded by an appropriate sand mold and steel is melted and poured into the mold to fill the gap between the spaced rails. As the molten metal solidifies, the rails are joined; however, this process, which is universally used, has a failure rate that has been reported to be as high as 75%. In addition, the rails must be melted by the molten steel poured into the gaps between the rails. This melting requirement is not consistently met and also contributes to the failure of the joints produced in the field by the thermite process. To drastically decrease the deficiencies of the universally used thermite process, wherein steel is cast into the gaps between the rails, the ends of the rails may be joined by a flash butt welding process where the ends of the rails are driven together by tremendously high forces while electricity is passed between the rails. This causes the ends of the rails to become molten and pressure welded together. This process drastically reduces the failure rate of the joint to less than 10%.

However, the flash butt welding process is best performed on rails in a manufacturing facility where the rails are not fixed on ties and can be forced together by stationary hydraulic equipment. To overcome the disadvantage of the universally used thermite process, the flash butt welding process has been modified for use in the field. However, the time for the welding process is substantially higher than the thermite process, since the rails must be stretched during the hydraulic forcing step, which step requires disconnecting one or both of the rails from the ties. This manual procedure must be reversed after the welding process has occurred, which is extremely time consuming.

Flash butt welding of rails consumes a portion of the rails which causes difficulties after the welding process has been completed. Also, sections of rails may have to be spliced into the rail to provide the necessary rail material for the weld. In addition, it is deficient to transport the hydraulic equipment needed to create the tremendous pressure between the rails to remote locations as required in the field. The butt welding process also produces a flash around the periphery of the joined rails which must be sheared off and then ground to allow a smooth operation and also to prevent stress concentrations in the joint during use. Even though the flash butt welding process drastically reduces the rate of failure of the joints made in the field, the thermite process is still used because it can be done rapidly by merely putting a mold around the gap between the spaced rails. The process does not require large hydraulic equipment and is relatively inexpensive. The failure rate is addressed by again performing the thermite process when a joint has failed. In doing this, a large section of the rail must be cut and a new section of rail is inserted in the open area. Consequently, a failed thermite joint normally results in the need for two replacement thermite joints, with their propensity for failure. As can be seen, even though the thermite process is universally used, there is a substantial need for some process which will join the rails in the field, which process has a low failure rate, but has the advantages associated with the thermite process. This need has existed for many years. Arc welding processes have been tried periodically, such as electroslag, continuous arc welding and submerged arc welding and combinations thereof. None of these processes has been successful because they use impractically large equipment, take an unacceptably long time to weld and finish grind, and have not resulted in acceptable failure rates. The arc welding process, especially in the lower part of the gap between the rails, has been inconsistent. In addition, these prior attempts to use arc welding for joining the ends of spaced railroad rails were expensive, required complex equipment and demanded a substantial time to prepare for the welding process and actually performing the welding process. Such time is not available in field welding of rails.

The welding methods and systems disclosed in my aforementioned patents and application address the foregoing disadvantages and problems encountered in connection with prior art techniques and, basically, provide for the ends of steel rails to be joined by longitudinally spacing the rails from each other to define a gap extending laterally therebetween and having base, web and head portions, positioning a barrier plate in the base gap so as to provide electrical contact between the barrier plate and the two rails, and filling the base, web and head gaps with molten metal by the gas shielded electric arc welding process which is initiated by bringing a welding gun downwardly into the gap until the filler metal electrode contacts the barrier plate to create the starting arc. In particular in connection with the methods and systems disclosed in my aforementioned patent U.S. Pat. No. 5,773,779, the root pass is laid using the spray transfer arc welding process and by moving the electrode laterally across the gap while oscillating the electrode longitudinally during the lateral movement. The spray welding process advantageously allows high penetration and high heat in the large area at the base of the rails. After the root pass and the next several layers are applied using the spray transfer process, the power supply is switched to the pulsed arc welding process and additional passes are made to fill the remainder of the base gap again, by moving the electrode laterally of the gap while longitudinally oscillating the electrode. When the filling of the gap approaches the area of the lower end of the web gap, contoured copper shoes are used to enclose the web and head gaps, and the gap between the webs is filled by continuing the shielded gas welding process in the pulsed mode. Again, in filling the web gap, the electrode is moved laterally across the gap while being oscillated longitudinally so as to spread the molten metal against the shoes and the ends of the rails defining the web gap. In laying the successive beads in the web gap, the electrode is moved, successively, in laterally opposite directions along a single path which would be linear except for the oscillation of the electrode. With regard in particular to the filling of the head gap in accordance with the disclosure in my patent U.S. Pat. No. 5,773,779, the beads of filler material are laid in a manner which provides for weld reinforcement at the laterally opposite edges of the transition and central portions of the rail heads so as to optimize protection against vertical separation of the head from the web during subsequent use of the rails and the high forces which are imposed thereon by locomotives, railway cars or other vehicles moving thereacross and causing sinuous distortions in the rails and through the welded joints therebetween. More particularly in this respect, beads of filler material are continuously laid sequentially in laterally opposite directions and vertically above one another between the laterally outer edges of the transition, central and crown portions of the head with movement of the welding electrode delayed at the beginning of the laying of each bead in a manner which produces vertically successive beads extending in opposite directions relative to one another.

THE PRESENT INVENTION

The present invention relates to an improved method and system for using gas shielded arc welding to join the spaced ends of steel rails such as railroad rails in the field, which improved method and system provide an economical, rapid and mechanically and metallurgically sound technique.

In accordance with the present invention, an improved welding format is provided for filling the gaps between the base, web and head portions of the ends of steel rails to be joined and which format provides greater control over the welding process and improved weld quality. As before, a steel barrier plate is provided in the base gap, the rail are preheated to a temperature of about 900° F., and the base, web and head gaps are filled with molten metal by the gas shielded electric arc welding process which is initiated by bringing a welding gun downwardly until the filler metal electrode therein contacts the barrier plate. The two rails are grounded and the barrier plate engages therewith to provide electrical contact between the barrier plate and rails. The cored wire electrode can be a Lincoln Electric electrode sold as Railweld, and the electrode is shielded with an appropriate shielding gas of 95% argon and 5% carbon dioxide or oxygen. The metal of the electrode is selected to match the metal of the spaced rails to give the necessary yield strength, and the gas shield is provided around the advancing metal-cored electrode in accordance with standard practice. Likewise as before, the present invention uses a high performance digitally controlled power supply such as a Lincoln Electric Powerwave 450 power supply which has the capability of switching immediately between the constant voltage spray arc welding process and the controlled pulsed arc welding process.

Further in accordance with the present invention, the unique welding format comprises the laying of a root pass in the base gap by the spray welding technique, laying the second layer in the base gap beginning with the pulsed welding process and ending with the spray welding process, and completing the filling of the base, web and head gaps using the pulsed arc welding process. The spray welding process for the root pass promotes high penetration and a high heat in the large area of the base of the rails and, in accordance with one aspect of the invention, the root pass is applied by moving the electrode across the base gap along a single path while oscillating the electrode laterally with respect to the direction of the path. In accordance with another aspect of the invention, the second layer is made by immediately switching from the spray welding process to the pulsed welding process at the end of the root pass, and moving the electrode along a rectangular path including a side along the end face of one of the rails to the opposite end of the gap, thence longitudinally of the gap to the end face of the other rail, and thence along the latter end face back towards the beginning end of the second layer. The bases of the rails, and thus the base gap, have a length of about six inches, and at a location which is preferably about two inches from the end of the second layer, the process is immediately switched from the pulsed welding to the spray welding process for completion of the second layer. This bead pattern and welding process enables continuity of the laying of weld metal without arc extinction, and the amount of time used for laying the weld bead of the second layer along one side of the gap and then back along the other side of the gap allows the ending end of the root pass to adequately solidify and cool. Switching from the pulsed to the spray welding process for the last two inches of the second layer improves the root pass center line solidification structure. In this respect, at the ending end of the root pass there is a weld crater in which the weld metal solidifies from the outer edges into the center, whereby some shrinkage occurs. The center of the crater can have a large grain structure and can shrink apart and cause a weld defect. The spray welding process centers on this crater area and has a deep penetrating arc that reconsumes the root crater, fills any shrinkage area and refines the grain structure.

After completion of the second pass, the welding process is immediately shifted to the pulsed arc welding process and the remainder of the base gap is filled by continuously moving the electrode along rectangular paths having sides adjacent the rail end faces and ends between the sides at the opposite ends of the gap. Preferably, in laying the second and subsequent layers in the base gap, the electrode is oscillated laterally with respect to the direction of movement of the electrode along the sides and ends of the rectangular paths. When filling of the base gap is completed, copper shoes are positioned at the opposite ends of the web and head gaps, and the latter gaps are filled in their entireties using the pulsed arc welding process. Further in this respect, the web gap is filled by displacing the electrode in opposite directions in the gap along vertically adjacent paths while oscillating the electrode laterally with respect to the direction of movement of the electrode along the paths. The head gap is then filled by continuously moving the electrode along rectangular paths as described above and, preferably, oscillating the electrode laterally with respect to the direction of movement thereof along the sides and ends of the paths. The filling of the head gap is for the purpose and provides the bead structure shown and described in my aforementioned patent U.S. Pat. No. 5,773,779 and, for this purpose, movement of the electrode is delayed in each of the corners of the rectangular path between the adjacent sides and ends thereof.

Preferably, the steel barrier plate is of the structure basically disclosed in my aforementioned co-pending patent application and, in this respect, is clamped against the undersides of the rail bases and includes a central portion extending upwardly into the base gap. A heat insulating element underlies and spans the barrier plate, and a copper base shoe has an upwardly open recess for accommodating the insulating element and engaging the latter against the undersides of the rail bases such that the barrier plate is clamped in a fixed position relative to the bottoms of the bases. This assures good electrical contact between the rails and barrier plate, and the insulating element, base shoe and barrier plate provide an assembly which is insertable as a unit relative to the bottoms of the rail bases. The base shoe and insulating element engage the sides of the barrier plate against the undersides of the bases of the rails such that distortion or movement of the barrier plate by the expansion of the rails during the preheating operation is prevented as is distortion of the thin barrier plate by the advancing welding arc during the depositing of the root pass.

The exclusive use of the pulsed arc welding process for laying the remainder of the base gap, the web gap and the head gap advantageously enables maintaining the highest possible level of control over the welding process. In this respect, complete fusion to the rail end faces is achieved without melting excess rail material, and the melting of undesirable chemical elements into the weld puddle is minimized, thus to avoid a concentration of such chemical elements that could lead to a weld defect. Still further, the movement of the electrode along rectangular paths advantageously allows for variations in the width of the gap between rails to be joined without jeopardizing the weld quality in that the rectangular path enables adjusting bead placement relative to the rail faces.

A primary object of the present invention is the provision of an improved method and system for gas shielded arc welding of steel rails, which method and system can be performed rapidly in the field and have a low failure rate.

Yet another object of the present invention is a provision of an improved method and system, as defined above, which employs the concept of a metal barrier plate in the bottom of the base gap between the spaced rails to start the gas shielded arc welding process used in the method and system of the invention.

A further object of the invention is the provision of a method and system for joining steel rails in a manner which provides greater control over the welding process.

Another object is the provision of a method and system for joining steel rails and in which the laying of the root pass and second layer of weld metal in the base gap assures that the second layer provides a deep penetrating arc that consumes the crater at the end of the root pass to refine the grain structure and to fill any shrinkage area therein.

Yet another object is the provision of an improved method and system for joining steel rails which includes a bead laying format in a portion of the base gap and in the head gap between the rails which provides improved weld quality and which allows for variations in width of the gap between the rails without jeopardizing weld quality.

Still a further object is the provision of a method and system of the foregoing character which provides weld reinforcement in the laterally opposite edges of the rail heads to optimize protection against vertical separation of the heads of the rails from the webs thereof.

Another object of the invention is the provision of a method and system for joining steel rails in a manner which optimizes the strength of the weld and the gap between the heads of the rails.

BRIEF DESCRIPTION OF THE DRAWINGS

The foregoing and other objects and advantages will become apparent from the following description taken together with the accompanying drawings in which.

THE PREFERRED EMBODIMENT

Figure 1:
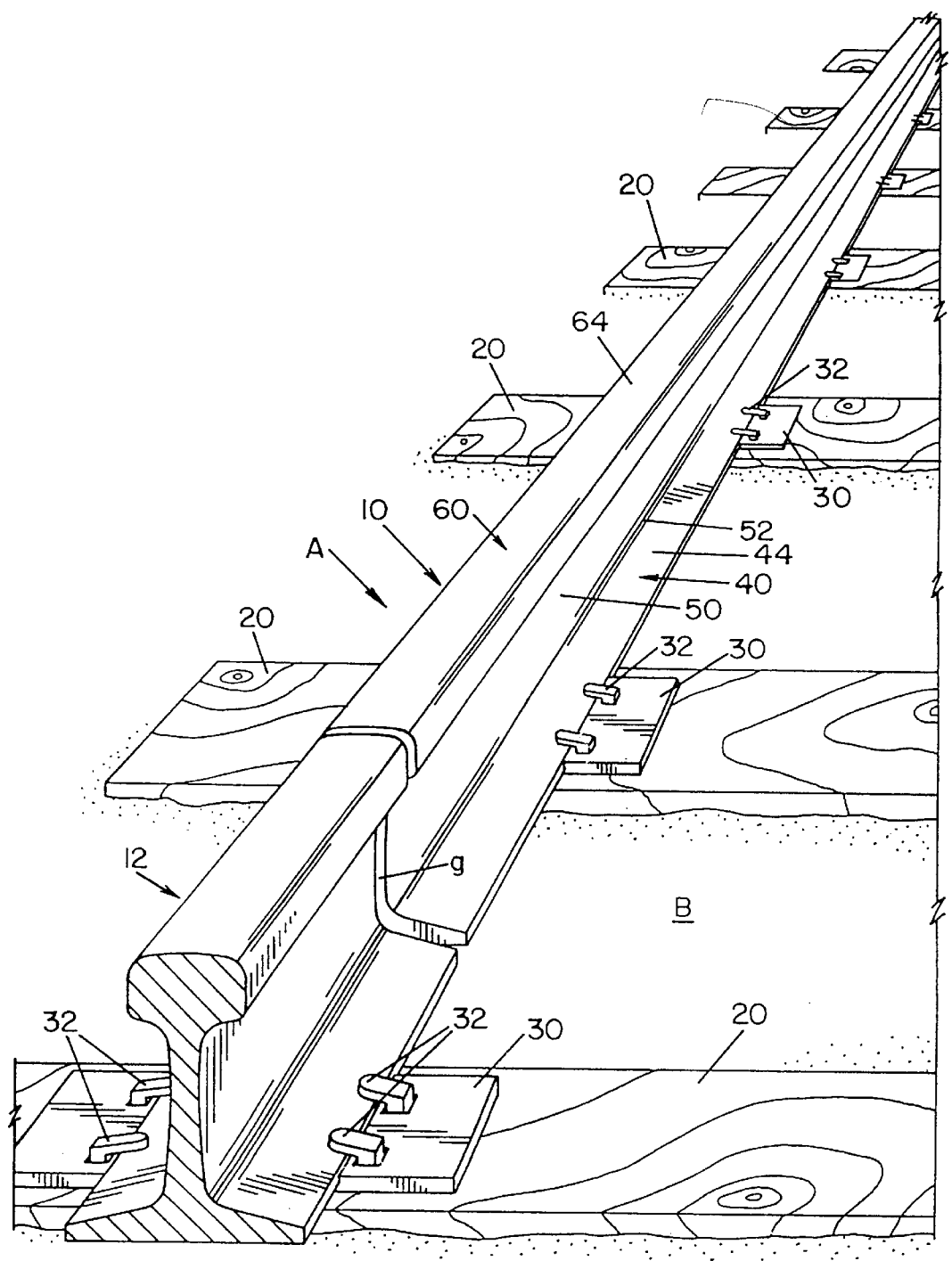
FIG. 1 is a pictorial view of a railroad with rails spaced to define a gap ready for joining in the field.
Figure 2:
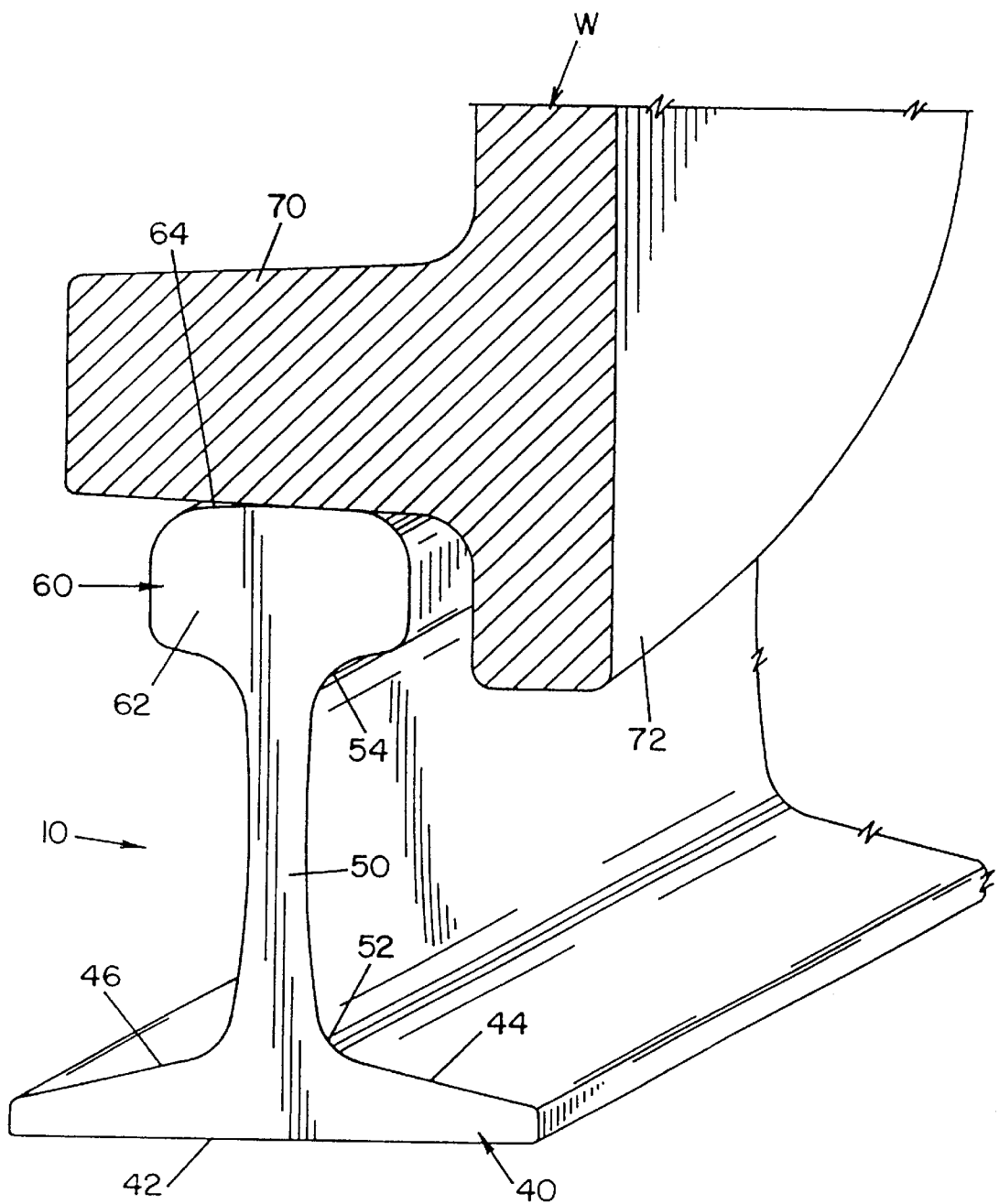
FIG. 2 is a cross-sectional view of the end of the rail with a part of the wheel shown for the purposes of illustrating the need for hardness at the head of the joint between the rails.

Referring now to the drawings wherein the showings are for the purpose of illustrating a preferred embodiment of the invention only and not for the purpose of limiting same, FIG. 1 shows a railroad rail A laid on right-of-way bed B and including rails 10 and 12 to be joined to form a continuous welded rail. Rails 10 and 12 are supported on bed B by ties 20, steel support caps 30 and spikes 32, and the rails are longitudinally spaced apart to define a gap g therebetween which is to be filled by molten metal to join the two rails together in the field. Gap g can be the gap between two sections of rail to be repaired or the gap between two sections of rail which are to be initially installed as a continuous welded rail system. If the gap g is used for repairing, it is sometimes necessary to cut the rails and insert a long rail section. This process is used for repairing rails which have fractures, joints which have fractured or joints which are defective. In all instances, the two spaced rails 10 and 12 are separated by a gap g which is generally 1.00 inches. Gap g extends laterally with respect to the direction of rails 10 and 12 and has longitudinally opposite ends at the laterally opposite sides of the rails. The pictorial representation in FIG. 2 shows rail 10 which has a standard profile or cross-section including a base 40 which is quite wide and includes a bottom 42 for stabilizing the rail on ties 20 to support the weight of trains passing along the rails. Base 40 has two upwardly angled top portions 44 and 46 that merge into a vertically extending web 50 having a lower fillet 52 and an upper fillet 54. The upper fillet merges into head 60 having a large body portion 62 and an upper wheel support surface 64, known as the rail crown. Surface 64 area receives a rolling wheel W having a cylindrical rim 70 and a disc 72 that prevents the wheel from moving to the left on the head 60 as the wheel rolls along the rail. In view of the contact of the wheel with the side of body portion 62, and the continuous high weight contact of rim 70 with upper surface 64, head 60 has a normal hardness of Brinell 300 with a range of −60 to +40 on the Brinell Scale. Since the head is hardened, the metal forming the rail, at least in the head portion, must be a fairly high alloy steel. The alloy steel used in the filler metal to fill gap g has a hardness along the upper portion of the rail in the area of gap g that meets the rail welding specification in accordance with the present invention.

Figure 3:
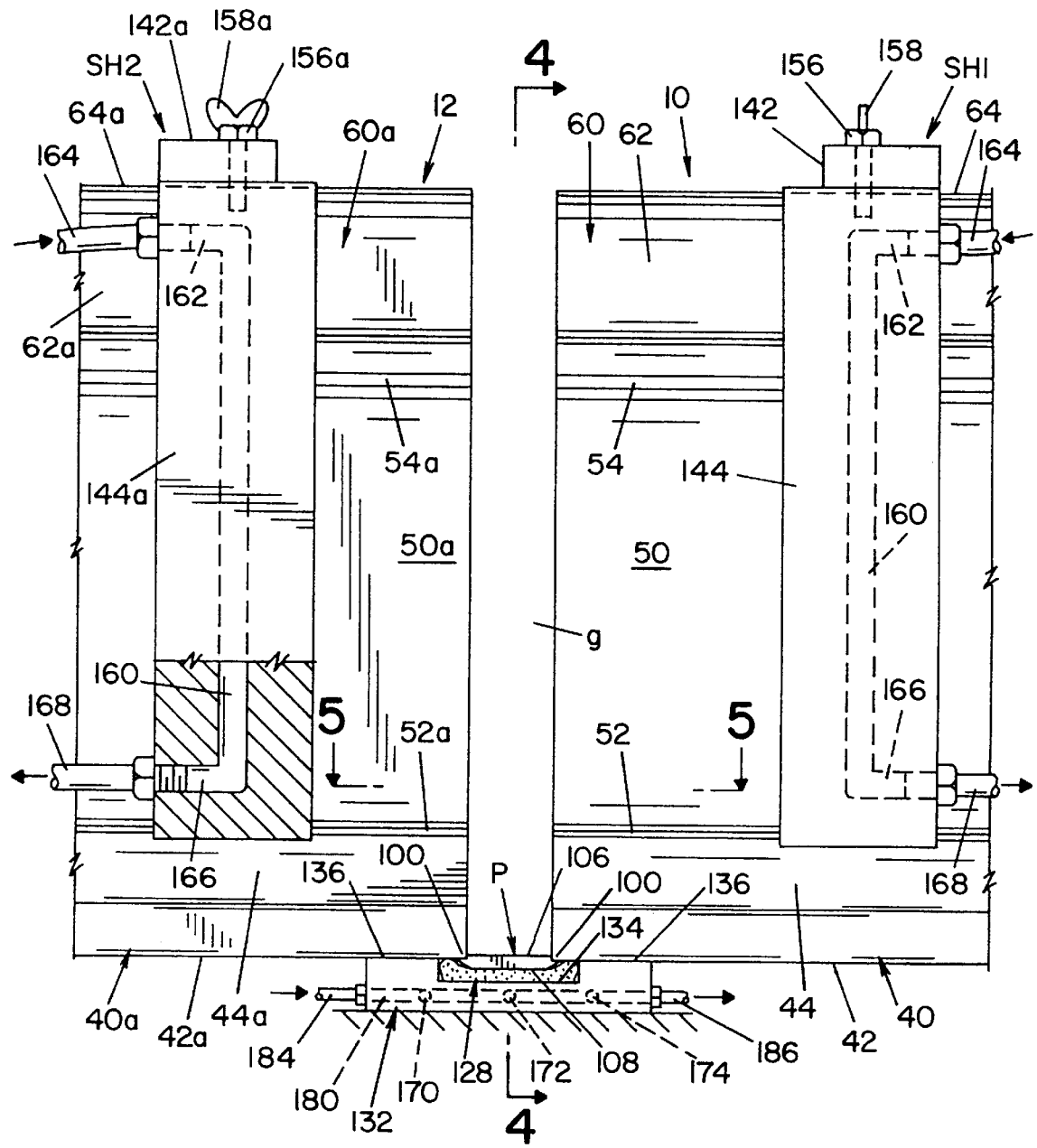
FIG. 3 is a side elevational view showing the spaced rails in association with a barrier plate, heat insulating element, base shoe and side mold shoes for performing a rail welding operation in accordance with the invention.
Figure 4:
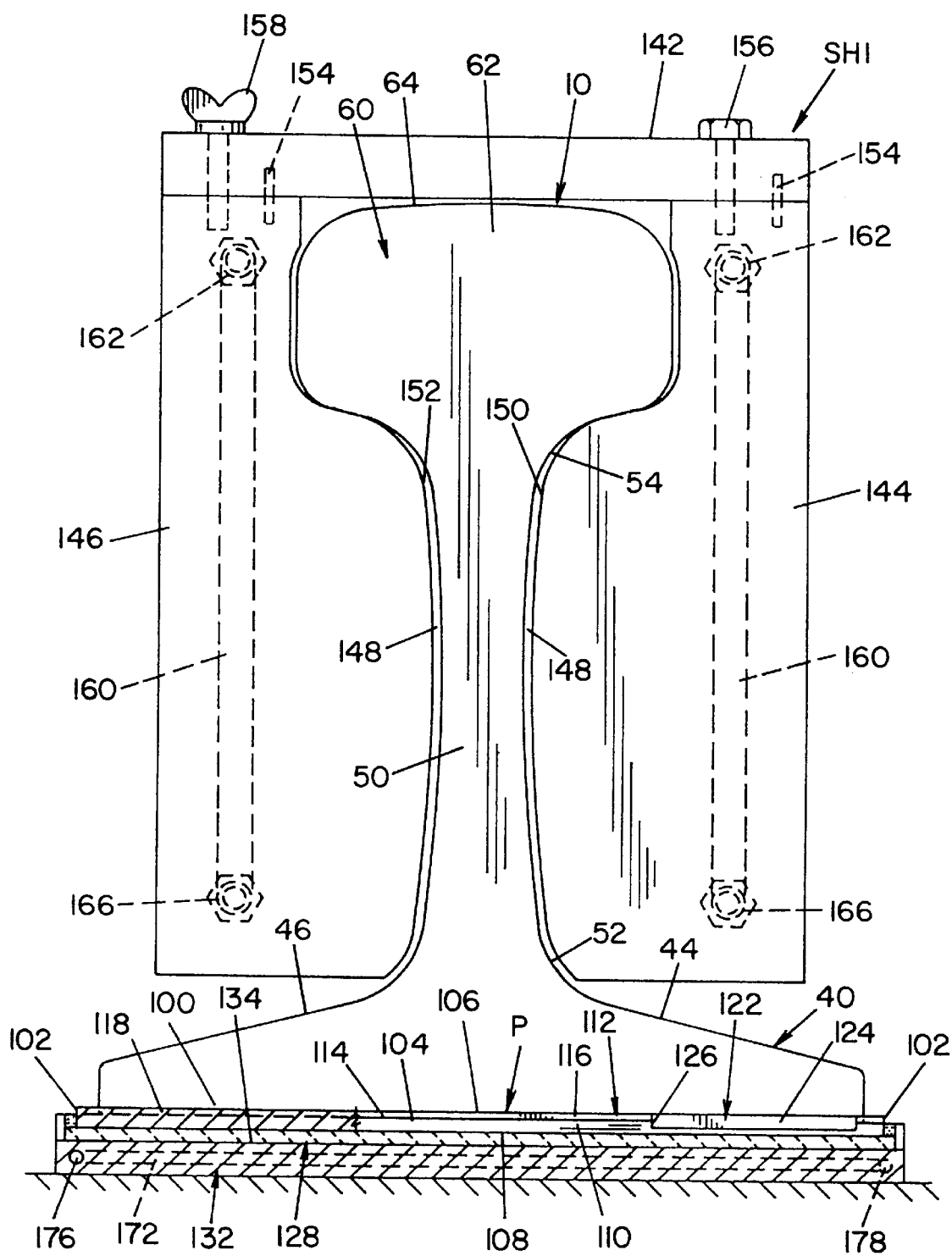
FIG. 4 is a cross-sectional view taken along line 4—4 in FIG. 3.
Figure 5:
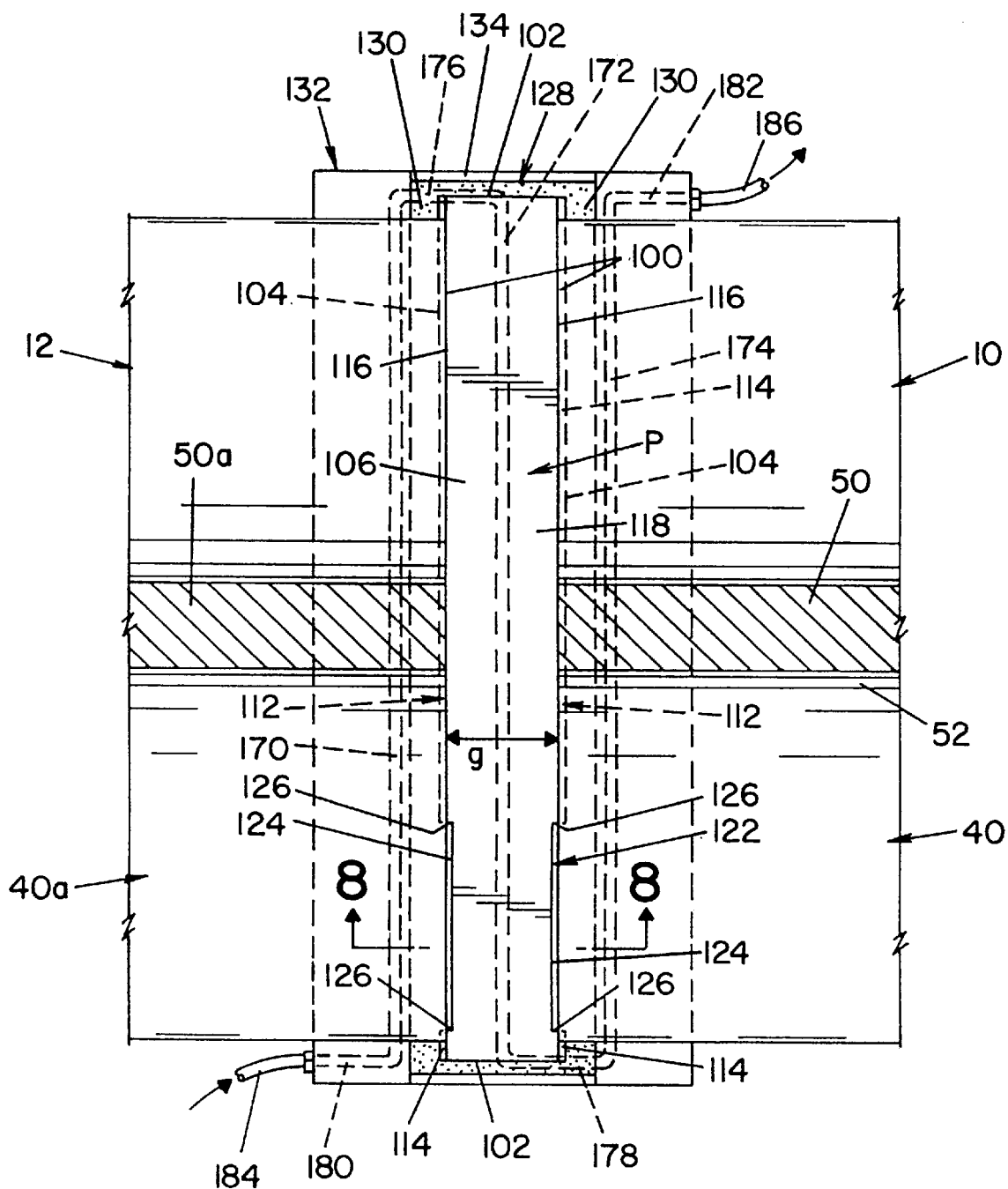
FIG. 5 is a plan view, partially in section, taken along line 5—5 in FIG. 3.
Figure 6:
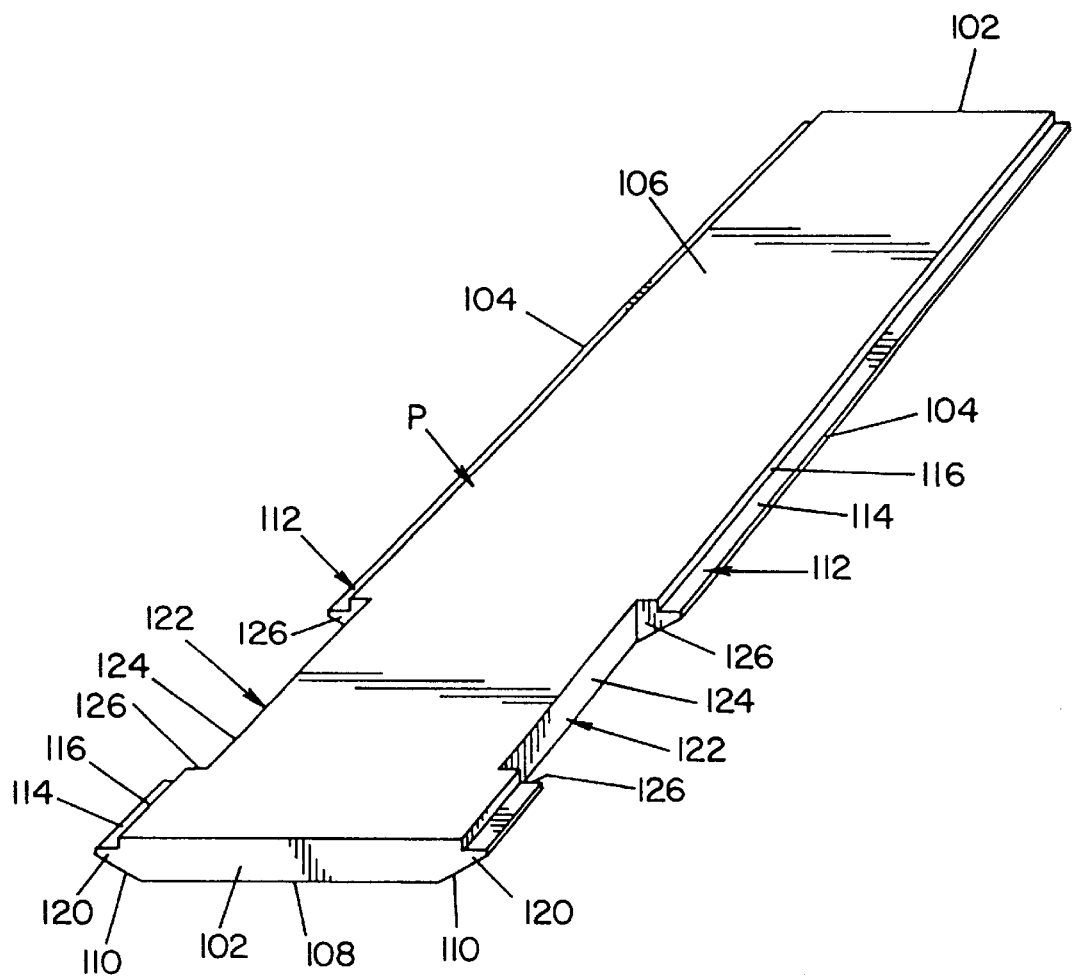
FIG. 6 is a perspective view of the barrier plate.
Figure 7:
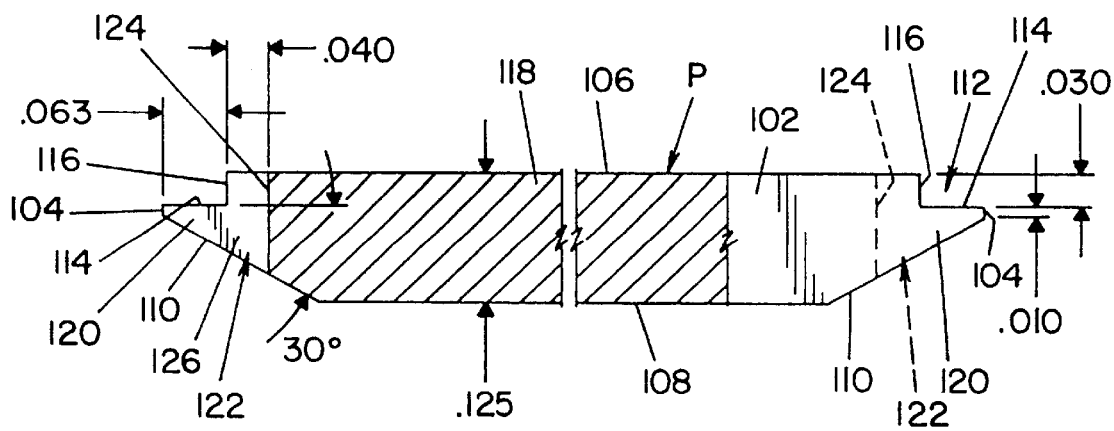
FIG. 7 is a partial cross-sectional view of the barrier plate shown in FIG. 6.
Figure 8:
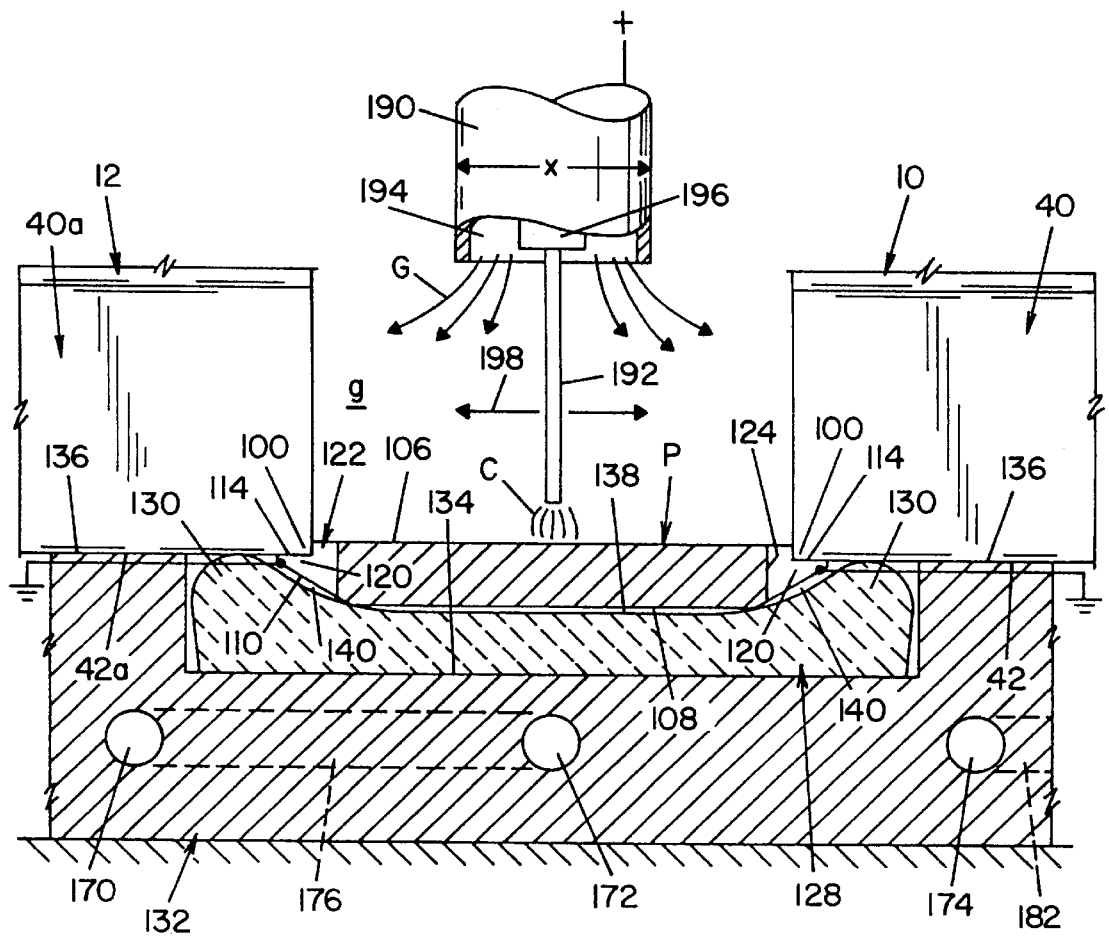
FIG. 8 is a cross-sectional elevation view taken along line 8—8 in FIG. 5 and showing the position of the electrode during laying of the root pass.

In FIGS. 3–5 and 8, the elements on rail 12 corresponding to elements on rail 10 are indicated by the suffix "a." This same designation will be used hereinafter in describing copper shoes SH1 and SH2 which are respectively draped over rail 10 and rail 12. Referring now to FIGS. 3–8, the bottoms 42 and 42a of the bases of rails 10 and 12 each have a laterally extending bottom edge 100 which, as will be appreciated from FIGS. 4 and 5, has a length corresponding to the distance between the laterally opposite ends of the corresponding rail base. As best seen in FIGS. 5–7, a barrier plate P in accordance with this embodiment is elongate in the lateral direction of gap g and has longitudinally opposite ends 102, laterally opposite side edges 104 extending between ends 102, a top surface 106, and a bottom surface 108 which includes chamfers 110. Each chamfer is initiated at about 0.040 inch below top surface 106 and extends downwardly and inwardly of the corresponding edge 104 at an angle of about 30° relative to the top surface. Laterally opposite side edges 104 provide the barrier plate with a width which is greater than the width of gap g between the rail bases, and recesses 112 are provided in top surface 106 inwardly of side edges 104 and between the opposite ends of the barrier plate. Each recess 112 includes a bottom wall 114 parallel to top surface 106 and an inner side wall 116 perpendicular to bottom wall 114 and parallel to the corresponding side edge 104. Side walls 116 are laterally spaced apart to provide the barrier plate with a central portion 118 having a width which provides for the central portion to be received in gap g, as shown in FIG. 8, and as further seen in the latter figure, recesses 112 receive the adjacent portions of bases 40 and 40a of rails 10 and 12 and provide the barrier plate with side portions 120 which underlie bottoms 42 and 42a of the rails. Preferably, each recess 112 has a width of about 0.063 inch and a depth of about 0.030 inch.

For the purpose set forth hereafter, each of the laterally opposite side edges of barrier plate P is provided with a laterally outwardly open passage 122 which extends between top surface 106 and chamfer portions 110 of the bottom surface of the barrier plate. Each of the passages 122 includes an inner wall 124 parallel to and spaced laterally inwardly of inner wall 116 of the corresponding recess 112, and longitudinally spaced apart end walls 126 extending laterally outwardly from wall 124. Passages 122 are preferably laterally aligned with one another and adjacent one of the ends 102 of the barrier plate, and the passages are spaced inwardly from the end of the plate so as to be located inwardly of the end of bottom edge 100 of the corresponding rail base. Preferably, for the purpose set forth hereinafter, barrier plate P has a length between ends 102 which is greater than the length of bottom edges 100 of the rail bases, whereby the spacing of passages 122 from end 102 is sufficient to provide for the passages to be spaced inwardly of the outer ends of the bottom edges 100, as shown in FIG. 5. Preferably, each passage 122 has a length of about 1.63 inches and a width of about 0.103 inch.

Further in accordance with this embodiment, as best seen in FIG. 8, a heat insulating element 128, preferably a ceramic tile, is positioned beneath barrier plate P between the opposite ends thereof, laterally spans the barrier plate and includes sides 130 overlapping the corresponding one of the side portions 120 of the barrier plate. Further, a copper base shoe 132 has an upwardly open recess 134 which accommodates heat insulating element 128, laterally spans the insulating element and provides the shoe with top surfaces 136 engaging the bottoms 42 and 42a of rails 10 and 12. Preferably, heat insulating element 128 has a profile providing a top surface 138 underlying and engaging bottom surface 108 of barrier plate P, and providing opposite sides 130 with a bulbous contour which engages the corresponding one of the bottom surfaces 42 and 42a of the rails laterally outwardly of side portions 120 of the barrier plate. The contour of sides 130 provide a pocket 140 beneath each rail bottom for the purpose set forth hereinafter. Preferably, heat insulating element 128 is positioned in base shoe 132 and barrier plate P is then positioned on the heat insulating element to provide an assembly which is then positioned as a unit beneath the ends of the spaced apart rails, whereby the barrier plate is positioned and fixed relative to the bottoms of the rails in good electrical contact therewith, and is fixed relative to the base gap between the rails so as to preclude movement or distortion of the barrier plate during preheating of the component parts and distortion of the barrier plate during the laying of the root pass.

As best seen in FIG. 4, shoe SH1 includes a top support bar 142 allowing hanging shoe segments 144 and 146 formed of heavy copper blocks to be slidable along the head of the rail. The top support bar 142 also provides for alignment of shoe segments 144 and 146 with one another and maintains the spacing of segment 144 from segment 146 as well as providing a gap 148 between the shoe segments and the rail sections. Facing inwardly of segments 144 and 146 toward the rail cross-section are faces 150 and 152, respectively, which match the contour of rail 10 so that the sliding of shoes SH1 and SH2 together at gap g closes the gap to produce a cavity having a cross-sectional shape of the rails 10 and 12. To stabilize the hanging shoes, alignment pins 154 are provided together with bolts 156 and 158 to allow assembly of the heavy copper segments 144 and 146. In operation, the shoes are moved to the position shown in FIG. 3 to open gap g and allow welding at the lower base portion of the rails. Thereafter, the shoes are moved together to close the gap to allow welding between the vertically extending web portions 50 and 50a and head portions 60 and 60a of rails 10 and 12, respectively. Preferably, base shoe 132 and side mold shoes SH1 and SH2 are provided with coolant passageways therethrough for the circulation of a coolant such as water during the welding process. More particularly in this respect, as best seen in FIGS. 3 and 4 with regard to shoes SH1 and SH2, each of the side segments 144 and 146 of shoe SH1 and each of the side segments 144a and 146a of shoe SH2 is provided with a vertically extending coolant passageway 160 having an entrance end 162 for connecting the passageway with a source of coolant, not shown, through an inlet line 164, and having an exit end 166 for returning coolant to the source through a return line 168. With regard to base shoe 132, as best seen in FIGS. 3 and 5, the portion of the shoe below the plane of the bottom of recess 134 is provided with a serpentine passageway defined by longitudinally spaced apart and parallel passageway portions 170, 172 and 174 and connecting portions 176 and 178 respectively between portions 170 and 172 and between portions 172 and 174. The serpentine passageway includes an entrance end 180 and an exit end 182 for respectively connecting the passageway with a source of coolant, not shown, through an inlet line 184 and a return line 186.

FIG. 8 illustrates a gas metal arc welding gun 190 in gap g and from which a metal-cored electrode 192 continuously issues during a welding operation. The wire electrode is preferably a Lincoln Electric electrode sold under the name Railweld, and as the electrode is advanced downwardly from gun 190, an arc C is created between barrier plate P and electrode 192. A shielding gas G is propelled from passage 194 which extends circumferentially about electrode guide 196 in accordance with standard gas shielded arc welding technology. Welding gun 190 has a diameter x of about ½ inch and, as mentioned hereinabove, the electrode has a diameter of about 1/16 inch and gap g has a width of 1.00 inch between the opposed end faces of rails 10 and 12.

The welding procedure which will be described in greater detail hereinafter, is initiated by preheating the rails and then laying the first or root pass layer of weld metal by moving the electrode from one end of gap g to the other along a path in the center of the gap as shown in FIG. 8 while oscillating the electrode laterally with respect to the direction of movement thereof along the path, as indicated by arrow 198 in FIG. 8. The laying of the root pass is initiated at the end of barrier plate P having passages 122 therethrough, whereby the complete penetration of weld metal at the beginning of the root pass is assured during the initial period when the welding heat is building up but has not reached the temperature necessary to consume the barrier plate in the areas of the sides thereof underlying the bottoms of the rails. As will be appreciated from FIG. 8, pockets 140 beneath the rail bottoms provide a space for the molten metal passing through passages 122 and, further, promotes full penetration through sides 120 of the barrier plate when the weld temperature is high enough for sides 120 to be consumed. Insulation 128 prevents penetration of the arc to the copper base shoe 132. In this manner base shoe 132 provides a good heat sink while the insulating element 128 precludes potential contamination by copper migration into the weld. Further in accordance with this embodiment and again as will be appreciated from FIG. 5, the opposite ends of barrier plate P extend laterally outwardly of the corresponding ends of the rail bases, preferably about one quarter inch, to provide weld run-on and run-off areas respectively at the starting point and ending point of the root pass to assure a high quality weld deposit along the entire length of the rail bases. At the completion of the welding operation the extra weld metal in the run-on and run-off areas can be removed such as by grinding. The root pass is applied by the spray welding technique to allow high penetration and a high heat in the large area of the base of the rails. A coolant such as water is circulated through the coolant passageway in base shoe 132 throughout the welding process, and when the layers of weld metal approach the web portion of the rails, the side mold shoes SH1 and SH2 are moved into place to enclose the gap and coolant is circulated through the components of the side mold shoes as the web gap and head gap are filled by continuing the shielded gas welding process.

Figure 9:
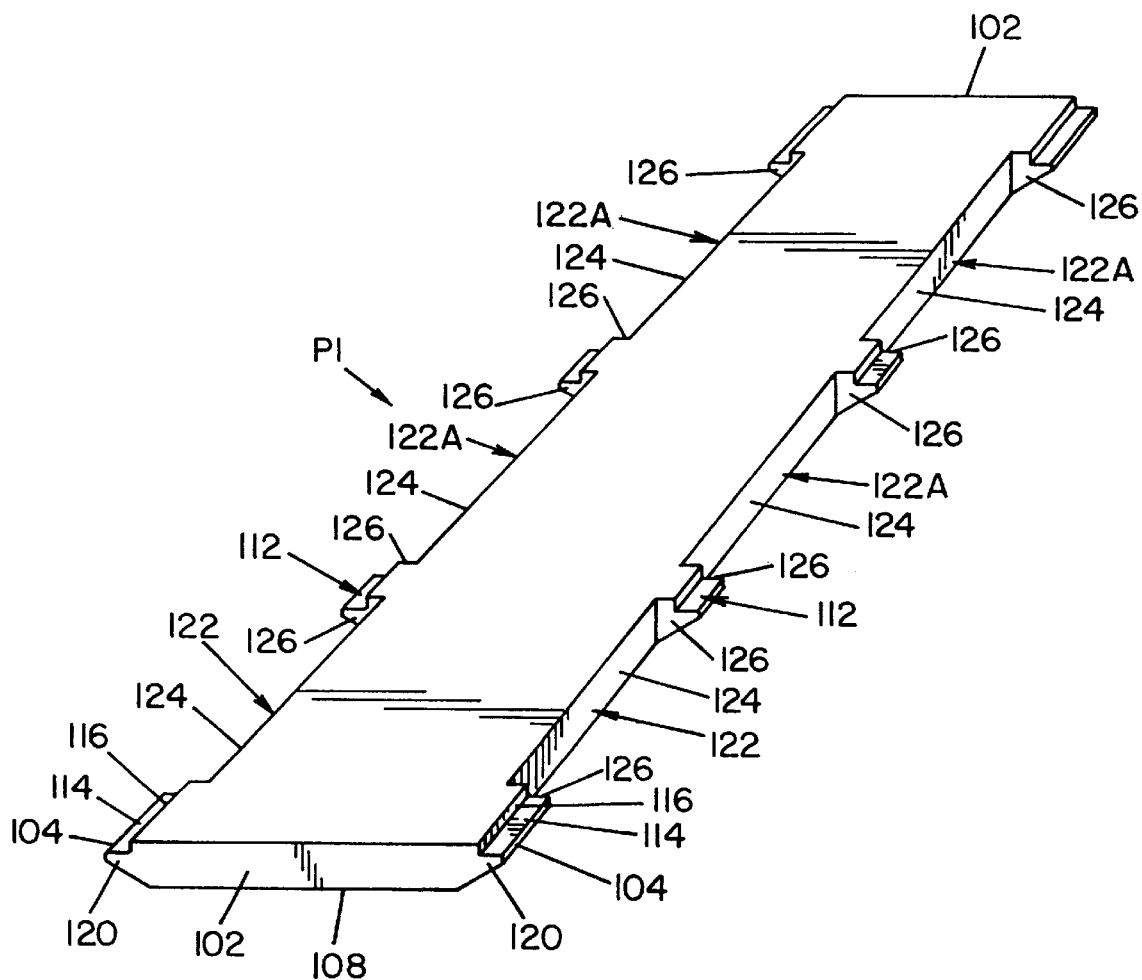
FIG. 9 is a perspective view of another barrier plate structure.

FIG. 9 illustrates a barrier plate P1 which is a modification of barrier plate P described above. In FIG. 9, plate P1 is provided with additional pairs of opposite, laterally aligned, outwardly open passages, designated 122A, which are spaced from passages 122 and from each other along the corresponding side of the plate by 0.25 inch. In all other respects, including dimensions, plate P1 is identical to plate P, whereby like numerals appear in FIGS. 6 and 9 to designate like parts.

Figure 10:
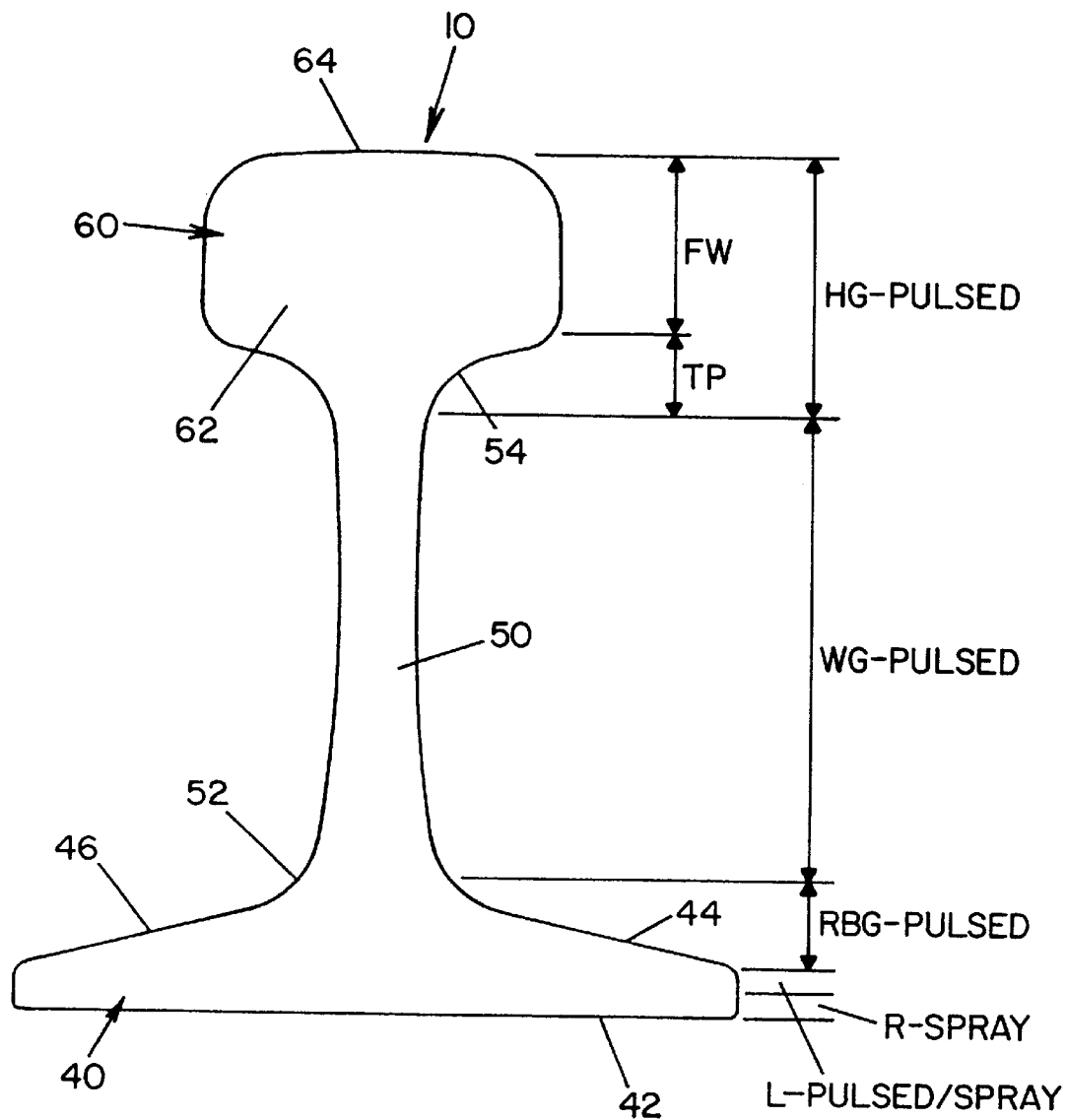
FIG. 10 is an end elevational view of the rail showing portions of the gap which are welded by constant voltage spray welding and by pulsed welding in the preferred embodiment of the present invention.

The welding process in accordance with the present invention is schematically illustrated in FIG. 10 in connection with rail 10. More particularly in this respect, the root pass R is laid in the manner set forth hereinafter using the constant voltage spray welding process for high heat and penetration as set forth hereinabove. The second layer L is laid as set forth hereinafter using the pulsed arc welding process and the spray welding process, and the remainder of the base gap RBG is laid using the pulsed mode of operation. The web gap WG and the bead gap HG, which includes transition portion TP and full width portion FW, are laid in the manner set forth hereinafter using the pulsed arc welding process.

Figure 11:
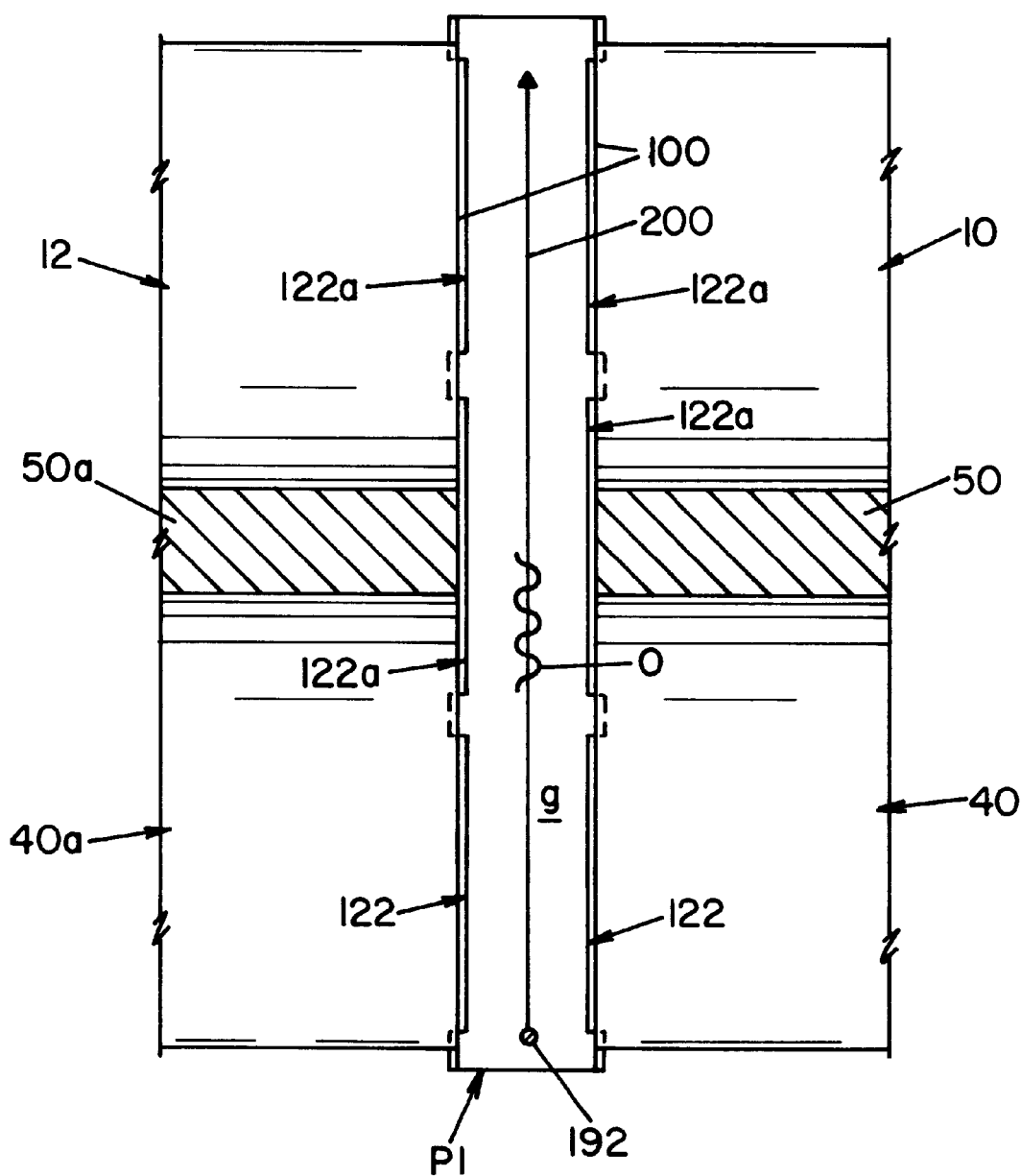
FIG. 11 is a schematic illustration of the position of the electrode at the start of the root pass.
Figure 12:
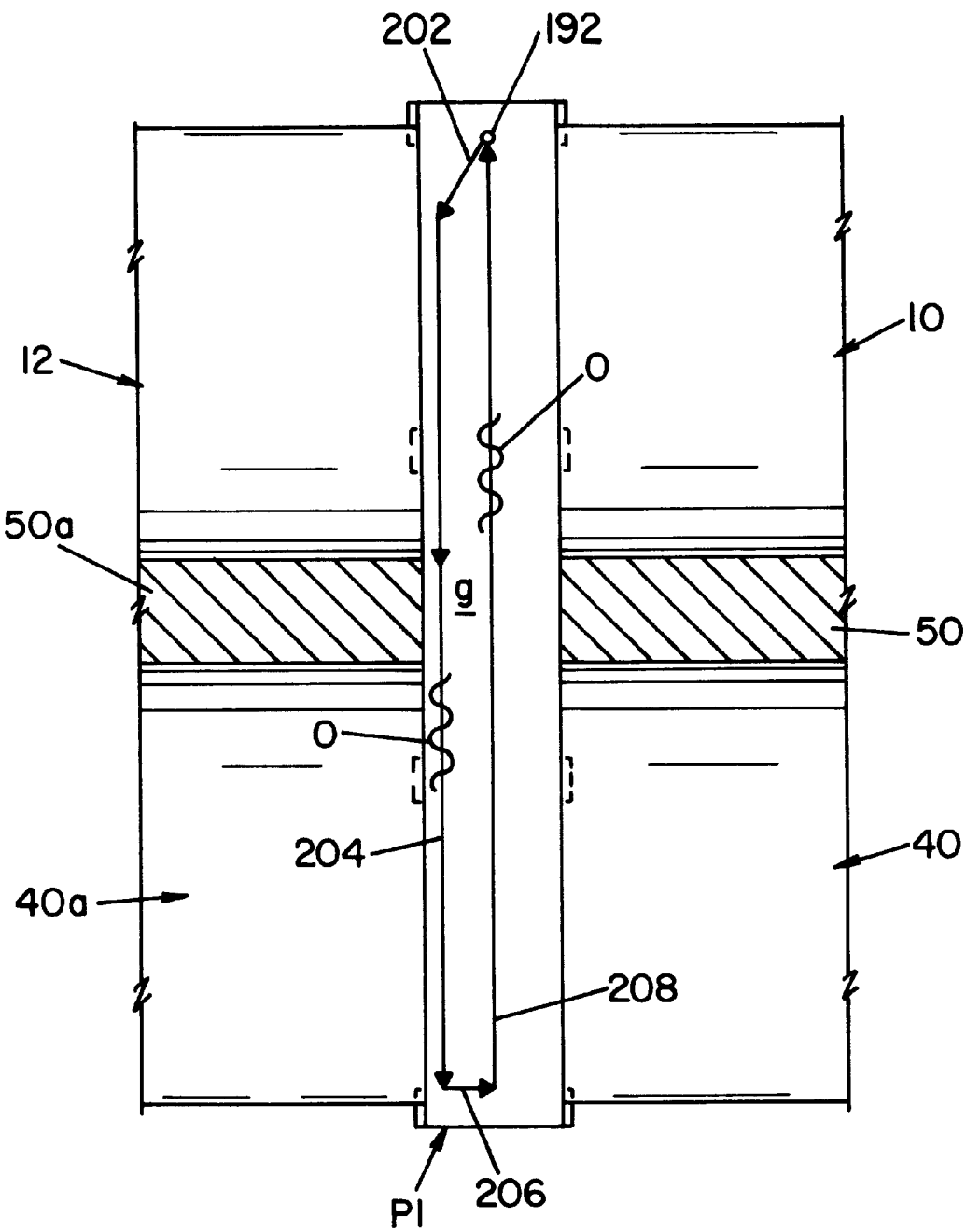
FIG. 12 is a schematic illustration of the rectangular path of movement of the electrode in laying the second layer in the base gap.
Figure 13:
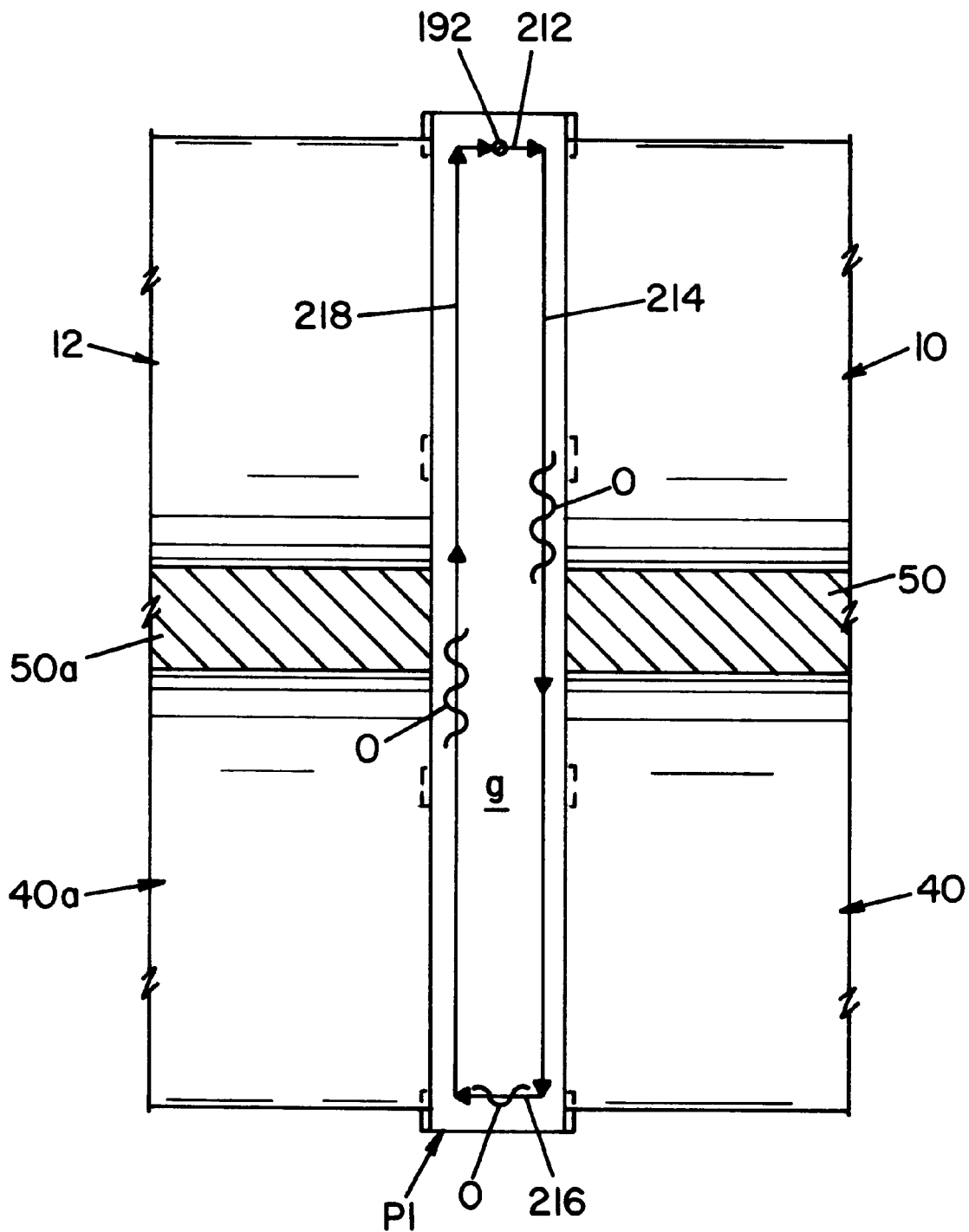
FIG. 13 is a schematic illustration of the rectangular path of movement of the electrode in laying the remaining beads of weld metal in the base gap.

Referring now to FIGS. 11–13, the latter Figures respectively schematically illustrate the laying of the root pass R, the laying of the second layer L and the filling of the remainder of the base gap RBG. FIG. 11 illustrates rails 10 and 12 spaced apart to provide gap g therebetween and shows barrier plate PI underlying the bottom edges of bases 40 and 40a of the rails. As mentioned hereinabove, the laying of root pass R is initiated at the end of the barrier plate having passages 122 therethrough, whereby electrode 192 is shown as being at the latter end of barrier plate P1 in FIG. 11. The upper surface of the barrier plate is used to strike the arc and, thereafter, electrode 192 is moved along a single path as indicated by arrow 200 from the position shown to a position at the opposite end of the base gap and, during such movement, the electrode is oscillated laterally with respect to the direction of movement thereof as indicated by sinuous line O.

As mentioned above, the root pass is laid using the spray arc welding process and, when electrode 192 reaches the opposite end of the barrier plate from which the root pass was initiated, as shown by the position of electrode 192 in FIG. 12, the welding process is immediately switched from the spray to the pulsed mode. The second layer is then laid by moving the electrode along a generally rectangular path having an end 202 inclined toward the end face of rail 12 so as to intersect the latter about 1¾ inch in from the end of the gap, a side 204 extending along the latter end face to the opposite end of the base gap, and end 206 extending from side 204 to the center of the gap g. At the latter point, the welding process is immediately switched back to the spray arc welding process and the electrode is moved along side 108 of the path to lay a bead down the center of the weld joint back to the starting position of the electrode. The rail bases are approximately six inches long in the direction laterally of the rails and preferably, as indicated by sinuous lines O in FIG. 12, electrode 192 is oscillated laterally with respect to the direction of movement thereof along the ends and sides of the rectangular path. In connection with laying the second layer, the time required for the electrode to move along one side of the path and then along the other side back to the beginning end of the path allows the terminal end of the root pass to adequately solidify and cool. Moreover, the terminal end of the root bead is in the form of a crater in which the weld metal solidifies from the edges into the center whereby some shrinkage occurs. The structure of the grains at the center of the crater can be large and shrink apart causing a weld defect. By completing the second layer using the spray mode, the bead at the terminal end of the second layer has a deep penetrating arc that reconsumes the root pass crater, fills any shrinkage area and refines the grain structure.

Following completion of the laying of the second layer, as indicated by the position of electrode 192 in FIG. 13, the welding process is immediately shifted to the pulsed mode and the remainder of the base gap RBG is filled by continuously moving electrode 192 along rectangular paths having, sequentially, an end 212 which, for the third layer only, begins at the center of gap g, a side 214 extending along the end face of rail 10 to the other end of the gap, an end 216 at the latter end of the gap and extending from side 214 toward the end face of rail 12, and a side 218 extending from end 216 along the end face of rail 12 back to the location of end 212. Again, electrode 192 is preferably oscillated laterally with respect to the direction of movement thereof along the ends and sides of the rectangular path as indicated by sinuous lines O. While a sequence of movement of electrode 192 has been described by which the electrode is moved along the rectangular paths in a clockwise direction, it will be appreciated that direction can be reversed from that shown.

Figure 14:
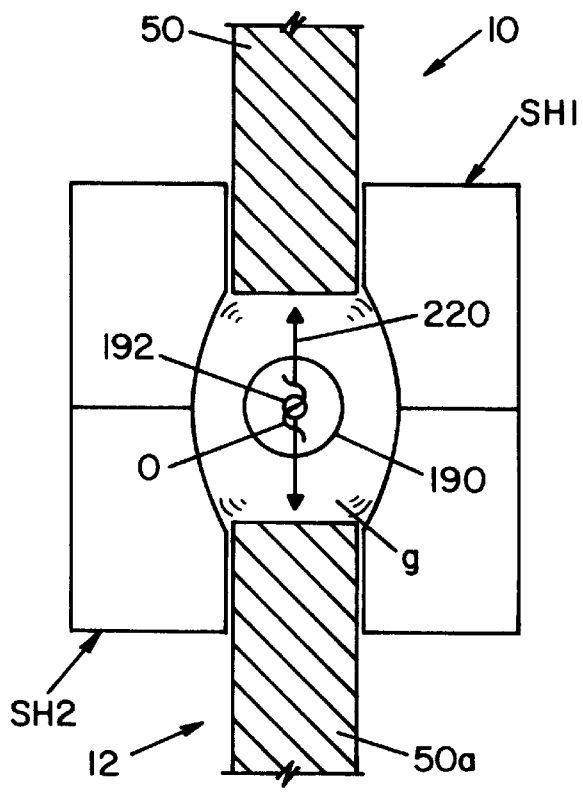
FIG. 14 is a somewhat schematic plan view, partially in section, illustrating the path of movement of the electrode in filling the web gap.
Figure 15:
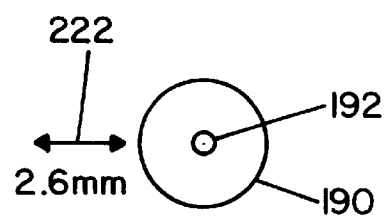
FIG. 15 is a schematic illustration of the welding gun and electrode shown in FIG. 14.
Figure 16:
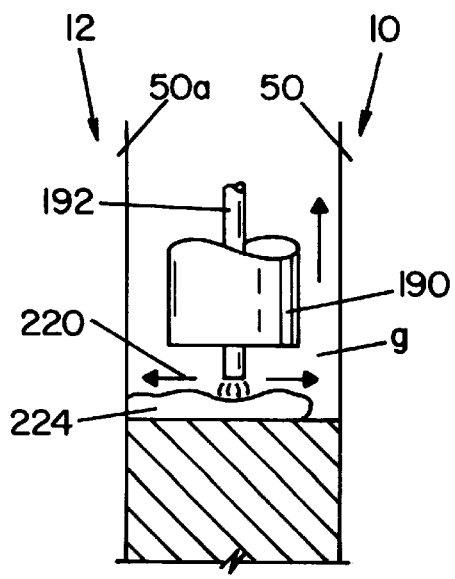
FIG. 16 is a somewhat schematic elevation view of the welding gun and electrode in the web gap looking in the direction from right to left in FIG. 14.

When the remainder of the base gap has been filled in the foregoing manner, copper shoes SH1 and SH2 are moved together to close gap g to accommodate filling the web gap WG. As will be appreciated from FIGS. 14–16 of the drawing, when the copper shoes are in place the web gap is filled by moving electrode 192 in opposite directions along a path 220 extending between opposite ends of the web gap in the direction between the rail ends. The sequential weld beads are laid using the pulsed arc welding process and, preferably, electrode 192 is oscillated laterally with respect to the direction of movement thereof along path 220 as indicated by sinuous line O in FIG. 14. As shown in FIG. 15, the total oscillating displacement of the welding gun and thus electrode 192 is 2.6 millimeters and, thus, 1.3 millimeters in either direction from the center position of path 220 shown in FIG. 14. Such oscillating movement of gun 190 and electrode 192 provides for spreading the molten filler material 224 between the longitudinally opposed faces of shoes SH1 and SH2.

In connection with the welding process as thus far described, the welding gun and electrode are moved along the described paths in the gap between the remaining portions of the rail bases and the gap between the rail webs at a uniform speed, whereby the successive layers of weld metal in these gaps are substantially of uniform vertical thickness between the beginning and ending ends thereof. When the welding process reaches the upper end of the gap between the rail webs, and thus the lower end of the gap between the transition portions 54 of the rail heads, welding in the pulsed mode continues, but the manner in which the beads are laid is modified. As will become apparent from the following description of FIGS. 17–22, the beads are laid in the gap between the heads by continuously moving the electrode along paths having sides along the faces of the rails and ends adjacent the ends of the gap and by controlling the movement of the electrode along the paths such that each of the successively laid beads has a beginning end which is vertically thicker than its ending end and disposed in cantilever relationship with the corresponding one of the laterally opposite edges of the head.

Figure 17:
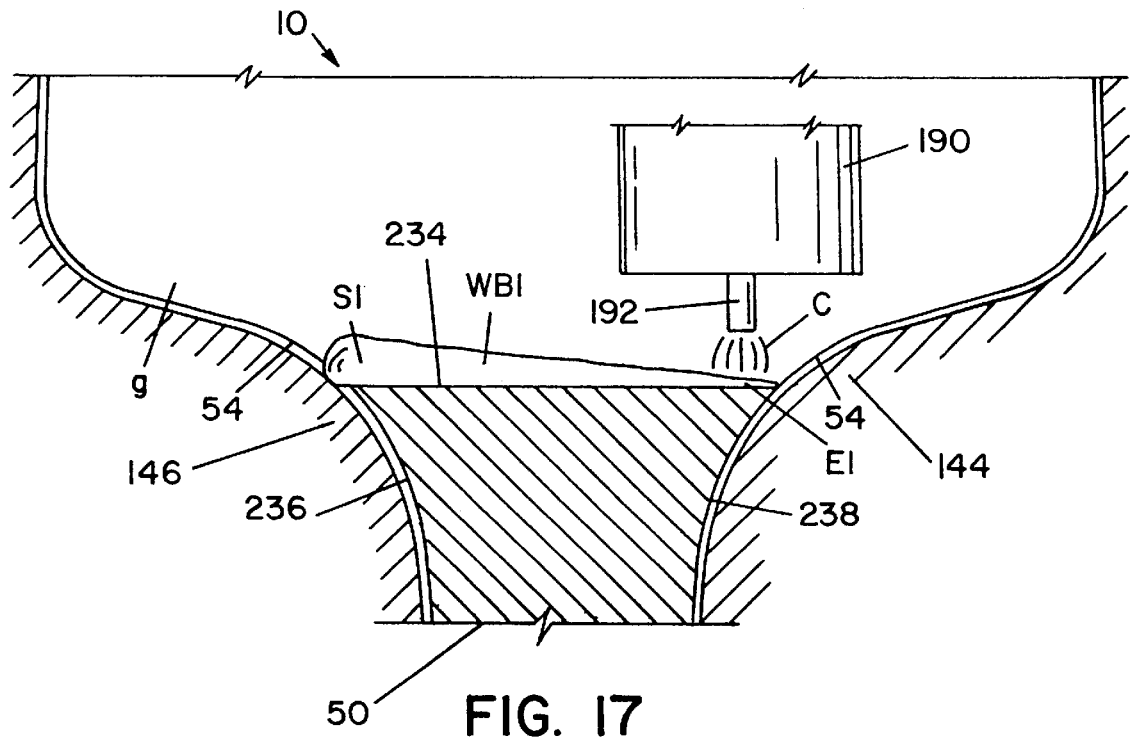
FIG. 17 is an enlarged cross-sectional elevation view through the gap between the rail heads and illustrating the laying of a bead of filler material in the gap between the transition portions of the heads in accordance with the present invention.
Figure 18:
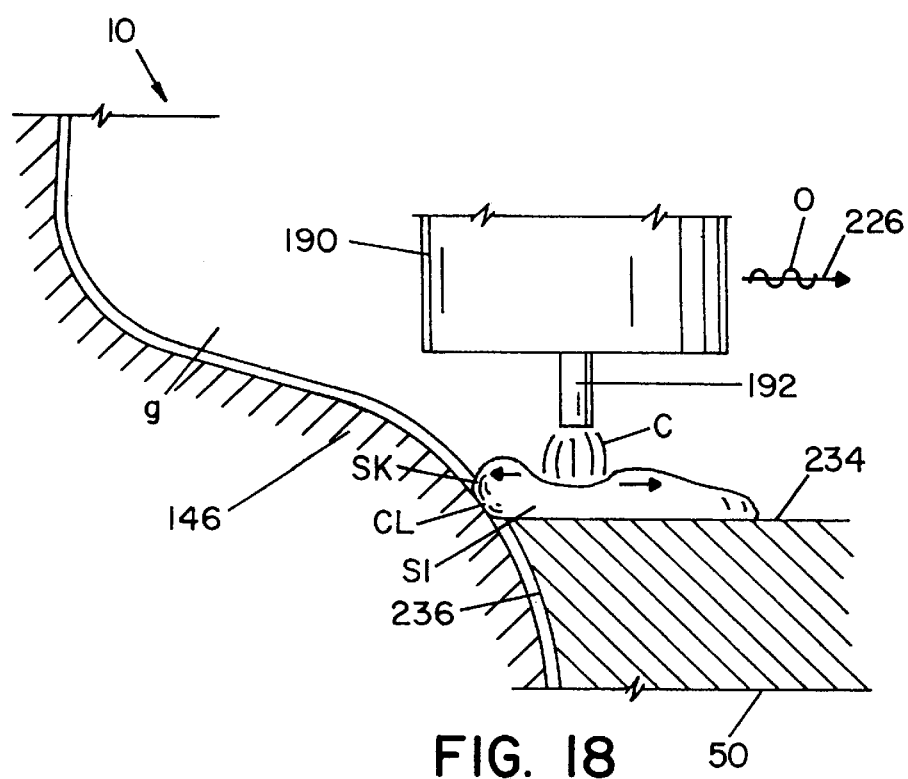
FIG. 18 is an enlarged detail view illustrating the holding of the welding electrode at the starting end of a bead corresponding to the lefthand end of the bead shown in FIG. 17.
Figure 19:
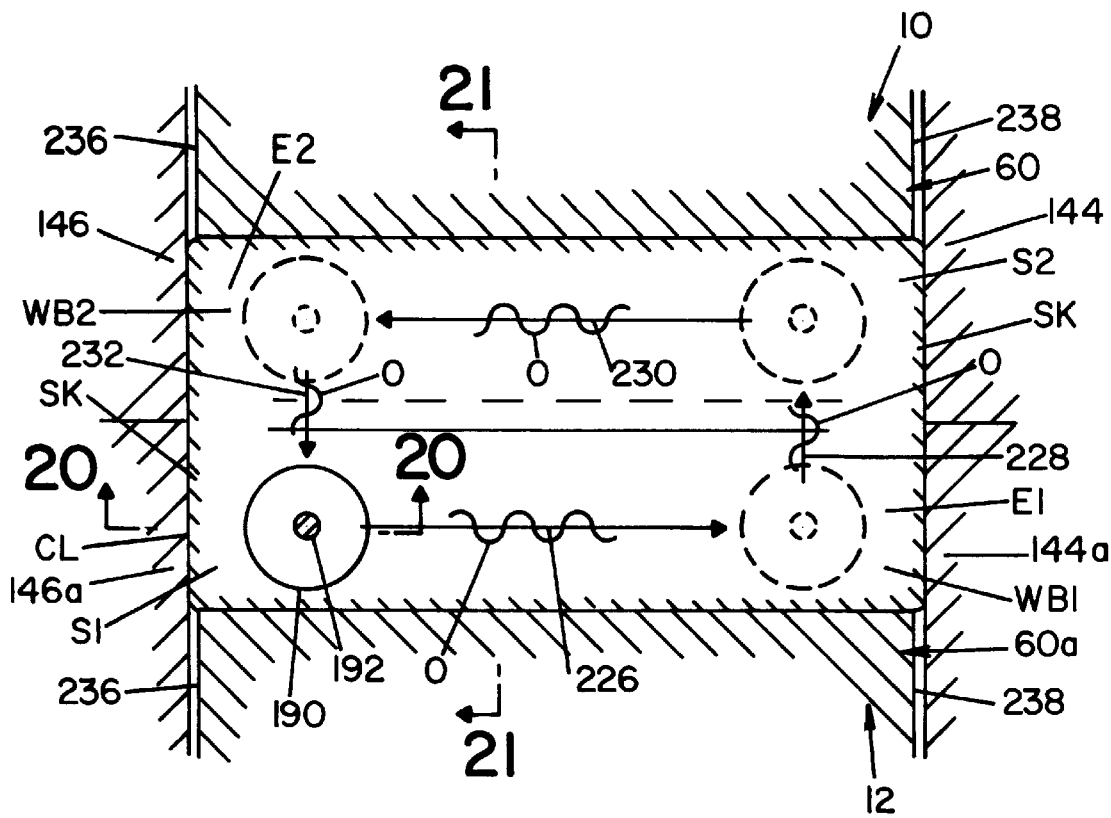
FIG. 19 is a schematic illustration of the rectangular path of movement of the electrode in laying beads of filler material in the transition area of the head gap.

With reference first to FIG. 19, which illustrates the path of movement of the electrode in filling the transition portion TP of the head gap, electrode 192 is continuously moved along rectangular paths having a start point at one end of the head gap and adjacent the end face of one of the rail heads and which starting point in FIG. 19 is represented by the solid line position of electrode 192 and gun 190. The rectangular paths include a side 226 extending from the starting point toward the opposite end of the head gap along the end face of the one rail head, and end 228 extending from the end of side 226 toward the other rail head, a side 230 extending from the end of end 228 back toward the first end of the head gap along the end face of the other rail head, and an end 232 extending from the end of side 230 back to the starting point of the path. Preferably, as indicated by sinuous lines O, electrode 192 is oscillated laterally with respect to the direction of movement thereof along the sides and ends of the paths. With reference then to FIG. 17, assuming numeral 234 to represent the upper surface of the last bead of filler material laid in the gap between the rail webs, the first welding bead WB1 laid in the gap between the transition portions of the rail heads is laid along side 226 of the path and has starting and ending ends S1 and E1, respectively, adjacent laterally opposite edges 236 and 238 of the head gap. Further, bead WB1 is vertically thicker at first end S1 than at second end E1 thereof and, as shown in FIG. 18, has an outer end CL at the first end thereof which extends outwardly in cantilever fashion from outer edge 236 of the gap. The manner in which the bead profile and cantilevered end are achieved will be appreciated from FIGS. 18–20 taken in conjunction with FIG. 17. In this respect, as shown in FIGS. 18 and 19, welding gun 190 and electrode 192 are initially positioned adjacent edge 236 at the starting end of the rectangular path and are ultimately moved to the right in FIGS. 18 and 19 along side 226 of the path toward edge 238 of the gap. In accordance with the invention, the welding gun and electrode are delayed or held at the starting end of side 226 of the path for a predetermined period of time, whereby the force of arc C drives the molten weld metal laterally and longitudinally of the starting end. While the weld metal is spread in the foregoing manner, it is important to note that there is no contact of the arc with the copper shoes and that the molten metal contacting shoe 146a as seen in FIGS. 17–20 forms a skin SK on the first end of the weld bead.

After the predetermined hold time at the starting end of the rectangular path, the welding gun and electrode are moved from the starting position shown in FIGS. 18 and 19 to the ending position E1 shown in FIGS. 17 and 19 and at a given rate of speed which, together with the delay at the starting end, provides for the welding bead profile to taper so as to be vertically thinner at the second end E1 thereof than at first end S1. At the corner between side 226 and end 228 of the rectangular path, movement of the electrode is delayed for a predetermined time to allow molten metal to flow outwardly against copper shoe 144a, and the electrode is then moved along end 228 to the corner between the latter end and side 230 of the rectangular path at which the electrode movement is again delayed to allow molten metal to flow outwardly against copper shoe 144. The position of electrode 192 at the corner between end 228 and side 230 of the rectangular path defines the starting end S2 of the second weld bead WB2 whereby it will be appreciated, as explained hereinabove with regard to weld bead WB1, that molten filler metal accumulates at the first end S2 of the second welding bead WB2 as a result of delaying movement of the electrode to provide a corresponding cantilevered end CL for bead WB2 extending outwardly of edge 238 as shown in FIG. 22. Following the delay, the welding gun and electrode are moved along side 230 of the path back towards edge 236 at a preselected rate of movement, whereby the latter movement together with the delay at the starting end of the second bead provides for welding bead WB2 to be vertically thicker at its first end S2 than at its second end E2. At the corner between side 230 and end 232 of the rectangular path, electrode 192 is again stopped for a predetermined time to allow molten metal to flow outwardly against copper shoe 146, and the electrode is then moved along end 232 back to the starting point. At the starting point, the electrode is again stopped for a predetermined period of time to allow molten metal to flow outwardly against copper shoe 146a and to provide the vertically thick starting end S3 for the third welding bead WB3, which end overlies the starting end of first bead WB1 as will be appreciated from FIGS. 19 and 21. The bead laying process along the rectangular path is then repeated to sequentially lay longitudinally adjacent beads along the end faces of the rail heads in the transition area of the head gap.

Figure 19A:
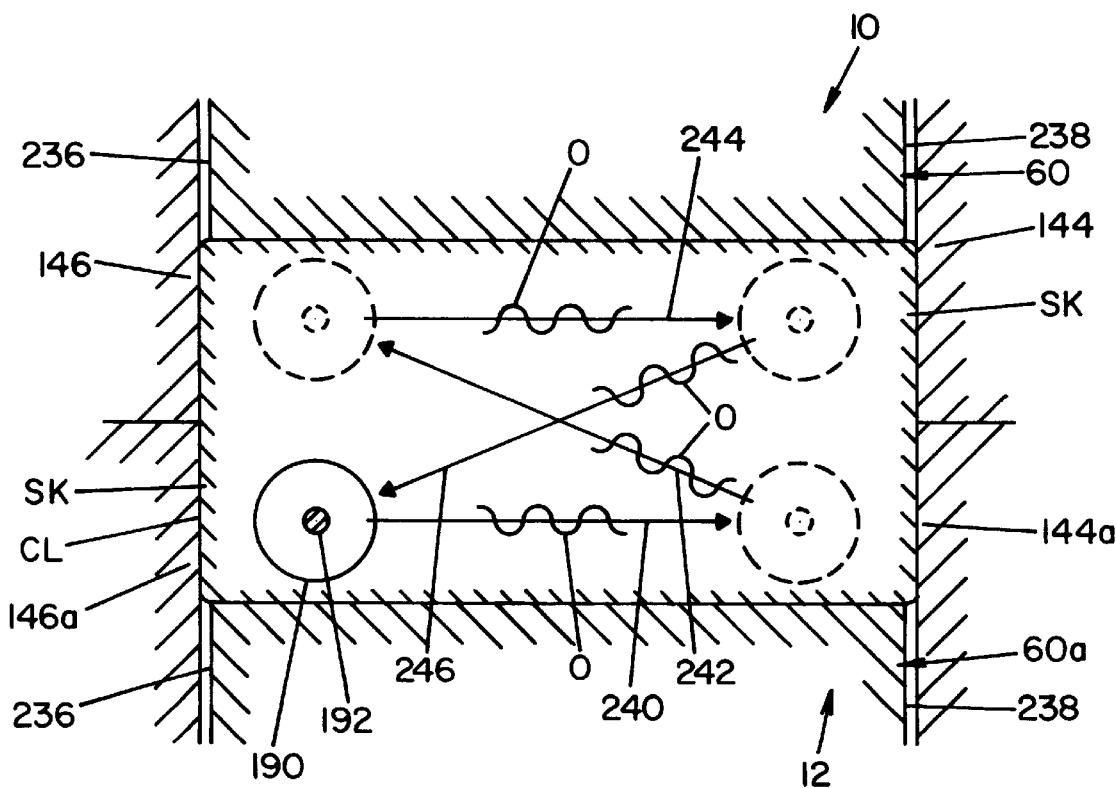
FIG. 19A is a schematic illustration of the path of movement of the electrode in laying beads of filler material in the full width portion of the head.
Figure 20:
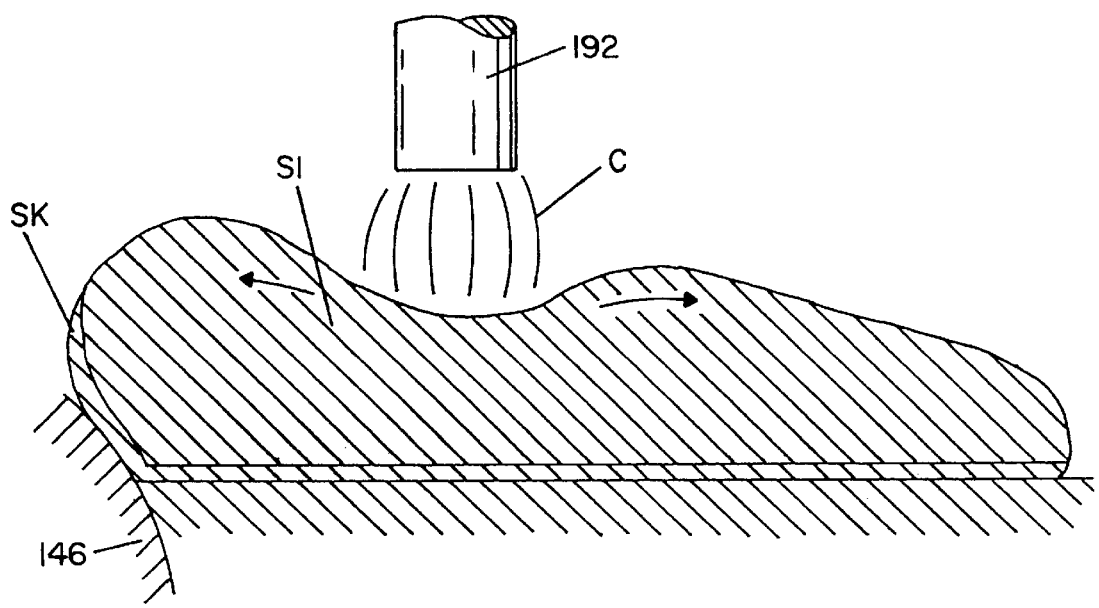
FIG. 20 is an enlarged sectional elevation view of the starting end of a bead in FIG. 19 taken along line 20—20 in FIG. 19.

When the filling of the transition portion TP of the head gap is completed in the foregoing manner, the pulsed arc welding process is continued for filling the fall width portion FW of the gap, but the path of the welding gun and electrode is changed from the rectangular path shown in FIG. 19 to the path shown in FIG. 19A which is somewhat in the configuration of a FIG. 8. In this respect, gun 190 and electrode 192 move continuously from a starting point at one end of the gap g which is represented by the solid line position of the gun and electrode, along a path including a side 240 extending along the end face of one of the rails to the opposite end of the gap, a transition leg 242 extending from the end of side 240 back to the one end of the gap adjacent the end face of the other rail, a side 244 extending along the latter end face to the opposite end of the gap, and a transition leg 246 extending from the end of side 244 back to the starting point of the path. This weld laying pattern advantageously provides for the weld deposit to cool more evenly and for the weld deposit to be more uniform. As with the bead laying pattern described above with regard to FIG. 19, the electrode is preferably oscillated laterally with respect to the direction of movement thereof along the path as indicated by sinuous lines O. Further, the gun and electrode are delayed or held for a predetermined period of time at the starting end of side 240 of the path and at each of the corners at which the direction of the path changes, and the gun and electrode are moved along the sides and transition legs of the path at a predetermined rate of speed. The FIG. 8 bead laying pattern is respected until the full width portion of the head gap is filled.

Figure 21:
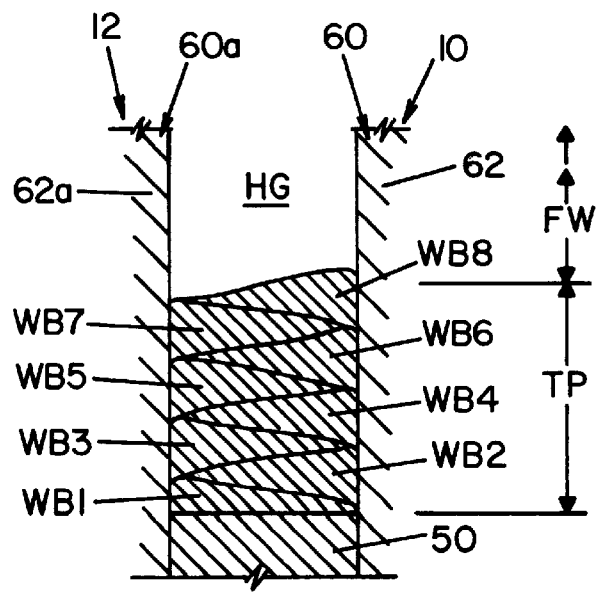
FIG. 21 is a sectional elevation view of beads laid in the head gap in accordance with the present invention and as seen along line 21—21 in FIG. 19; and, FIG. 22 is a cross-sectional elevation view through the gap between rails being welded and showing the gap between the transition portions of the rail heads to be filled by laying beads in accordance with the present invention.
Figure 22:
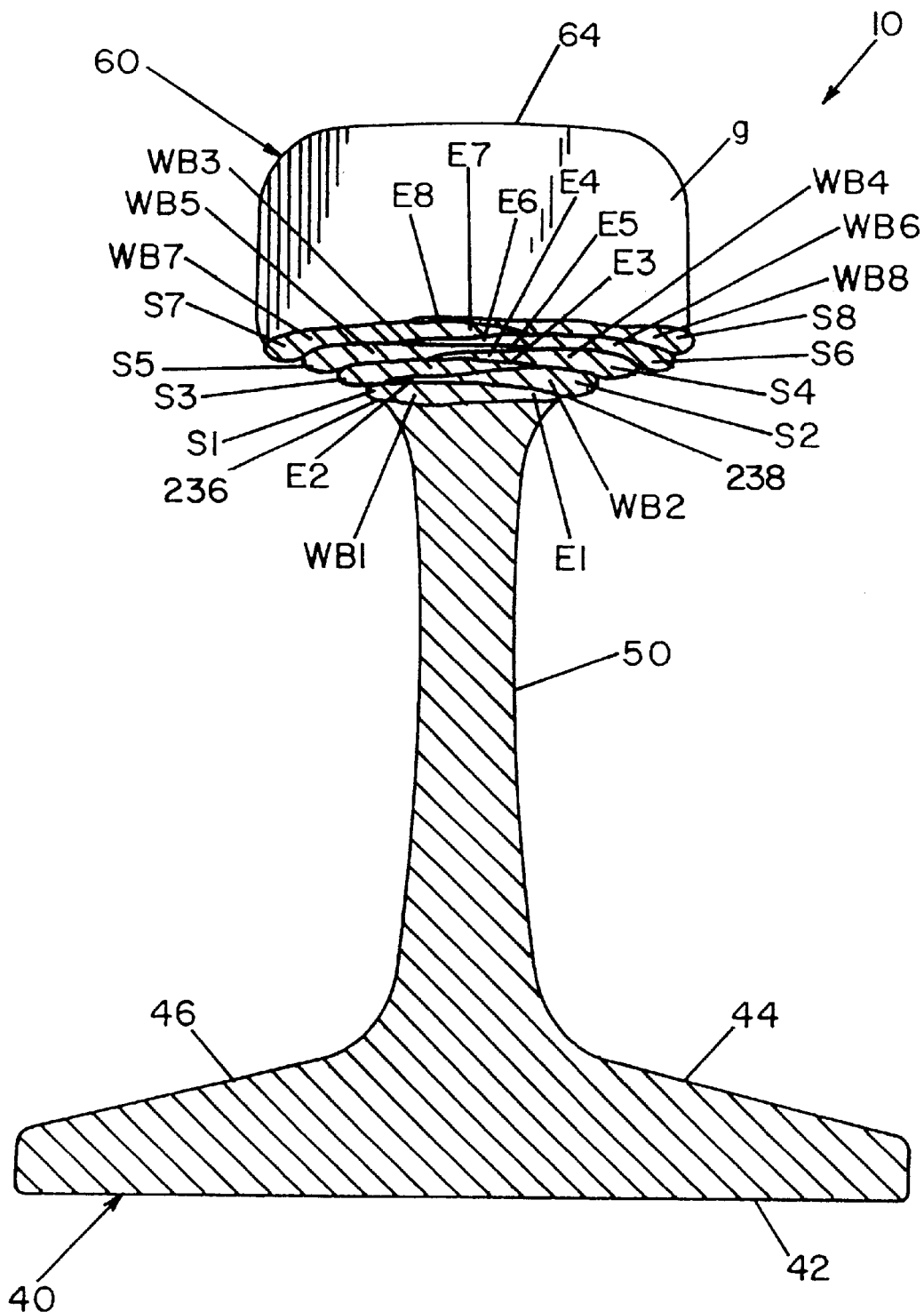

As will be appreciated from FIGS. 21 and 22, the vertically successive longitudinally adjacent weld beads in the transition portion TP of the head gap overlap in the transition area generally centrally between the rail faces, and the second ends of the vertically adjacent weld beads overlap laterally centrally of the gap. While not shown in FIGS. 21 and 22, the beads laid in the full width portion of the head gap as described above in connection with FIG. 19A basically have the same profile in cross-section and in the direction of the lengths of the beads. As can be further appreciated from FIG. 22, the first ends of the weld beads in both the transition and full width areas at each of the laterally opposite edges of the head gap are cantilevered relative to the underlying bead, thereby optimizing support for the overlying bead and optimizing the strength of the filler weld along the laterally opposite sides of the rails in the transition and full width areas of the heads thereof. Likewise, the vertically successive first ends of the weld beads in the full width central and crown portions of the gap between the rail heads, as well as along the transition portions thereof, advantageously provide weld reinforcement at the laterally opposite edges of the rail and optimize the strength of the weld between the head portions.

The time delay or hold time for the electrode at each corner of the path shown in FIGS. 19 and 19A is between 0.1 and 1.0 second. Moreover, it is preferred, following the delay at each corner, to move the electrode along the sides, ends and transition legs of the paths at speeds of up to 30 inches per minute and with a welding wire feed rate of from 100 to 320 inches per minute. The delay time, speed and feed rate provide for controlling the weld bead shape while maintaining good productivity and weld quality.

While considerable emphasis has been placed herein on the preferred embodiment and preferred parameters in connection therewith, it will be appreciated that many changes can be made in the disclosed embodiments without departing from the principles of the invention. Accordingly, it is to be distinctly understood that the foregoing descriptive matter is to be interpreted merely as illustrative of the invention and not as a limitation.

Having thus described the invention, it is so claimed:

1. A method of gas shielded arc welding steel rails each having a lower base, a vertically extending web and an upper head, said rails having laterally extending end faces longitudinally spaced apart to provide a base gap, a web gap and a head gap to be filled with steel to join said rails, each said base gap, web gap and head gap having laterally opposite ends, said method comprising the steps of filling said base gap, said web gap and said head gap with a molten steel from a filler metal electrode by a gas shielded electric arc welding process, said filling said head gap comprising continuously sequentially moving said electrode along longitudinally adjacent paths extending between the laterally opposite ends of said head gap each said path having starting and ending ends at a different one of said opposite ends of said head gap, and delaying movement of said electrode at the starting end of each said path for a preselected period of time.

2. The method according to claim 1, wherein said period of time is from 0.1 to 1.0 seconds.

3. The method according to claim 2, and oscillating said electrode laterally with respect to the direction of movement of said electrode along said paths.

4. The method according to claim 1, and oscillating said electrode laterally with respect to the direction of movement of said electrode along said paths.

5. The method according to according to claim 1, further including moving said electrode along longitudinally extending paths between said longitudinally adjacent paths, said longitudinally adjacent and said longitudinally extending paths having corners therebetween, and delaying movement of said electrode at each said corner for a predetermined period of time.

6. The method according to claim 1, wherein the starting ends of said longitudinally adjacent paths are at a corresponding one of said opposite ends of said head gap, including the further steps of moving said electrode along a path from the ending end of one of said longitudinally adjacent paths to the starting end of the other, and delaying movement of said electrode at the ending end of each of said longitudinally adjacent paths for a predetermined period of time.

7. The method according to clam 1, wherein said head gap includes a transition portion and a full width portion, said starting ends of said longitudinally adjacent paths in said transition portion being at a corresponding one of said opposite ends of said head gap and said starting ends of said longitudinally adjacent paths in said full width portion each being at a different one of said opposite ends of said head gap, filling said transition portion by moving said electrode along longitudinally extending paths between the ending and starting ends of said longitudinally adjacent paths, and filling said fill width portion by moving said electrode along catercorner paths between the ending and starting ends of said longitudinally adjacent paths.

8. The method according to claim 1, and delaying movement of said electrode at the ending ends of each of said longitudinally adjacent paths for a predetermined period of time.

9. The method according to claim 8, wherein said period of time is from 0.1 to 1.0 seconds.

10. The method according to claim 8, and oscillating said electrode laterally with respect to the direction of movement of said electrode along said paths.

11. The method according to claim 8, further including the step of vertically feeding said electrode at a feed rate varying from 100 to 320 inches per minute.

12. The method according to claim 11, wherein said period of time is from 0.1 to 1.0 seconds.

13. The method according to claim 12, and oscillating said electrode laterally with respect to the direction of movement of said electrode along said paths.

14. The method according to claim 1, further including the step of moving said electrode along said paths at a rate of speed of up to about 30 inches per minute.

15. The method according to claim 14, wherein said period of time is from 0.1 to 1.0 seconds.

16. The method according to claim 15, and oscillating said electrode laterally with respect to the direction of movement of said electrode along said paths.

17. The method according to claim 1, further including the step of vertically feeding said electrode at a feed rate varying from 100 to 320 inches per minute.

18. The method according to claim 17, wherein said period of time is from 0.1 to 1.0 seconds.

19. The method according to claim 18, and oscillating said electrode laterally with respect to the direction of movement of said electrode along said paths.

20. The method according to claim 17, further including the step of moving said electrode along said paths at a rate of speed of up to about 30 inches per minute.

21. The method according to claim 20, wherein said period of time is from 0.1 to 1.0 seconds.

22. The method according ot claim 21, and oscillating said electrode laterally with respect to the direction of movement of said electrode along said paths.

23. The method according to claim 1, wherein said filling of said head gap is by a pulsed arc welding process.

24. The method according to claim 23, wherein said filling of said base gap comprises the steps of laying a root pass of molten steel in said base gap by a spray transfer arc welding process, laying a second layer of molten steel in said base gap in part by a pulsed arc welding process and in part by a spray transfer arc welding process, and filling the remainder of said base gap with molten steel by a pulsed arc welding process.

25. The method according to claim 24, wherein said base gap has laterally opposite ends and said laying of said root pass comprises moving said electrode along a path from one of said opposite ends toward the other, and said laying of said second layer comprises moving said electrode along a first laterally extending path in a first direction between said opposite ends of said gap and laying a first bead along said first path by a pulsed arc welding process, moving said electrode along a second laterally extending path in the direction opposite said first direction, said second path being longitudinally adjacent said first path, and laying a second bead along said second path by a spray transfer arc welding process.

26. The method according to claim 25, wherein said second path is centrally of said base gap.

27. The method according to claim 25, and filling said web gap with molten steel by a pulsed arc welding process.

28. The method according to claim 27, wherein the filling of the remainder of said base gap comprises continuously moving said electrode along rectangular paths having laterally extending sides and longitudinally extending ends between said sides, and wherein said filling of said web gap comprises moving said electrode in longitudinally opposite directions therein.

29. The method according to claim 28, and oscillating said electrode laterally with respect to the direction of movement thereof in said base gap, web gap and head gap.

30. The method according to claim 28, wherein said head gap includes a transition portion and a full width portion, said starting ends of said longitudinally adjacent paths in said transition portion being at a corresponding one of said opposite ends of said head gap and said starting ends of said longitudinally adjacent paths in said full width portion each being at a different one of said opposite ends of said head gap, filling said transition portion by moving said electrode along longitudinally extending paths between the ending and starting ends of said longitudinally adjacent paths, and filling said full width portion by moving said electrode along catercorner paths between the ending and starting ends of said longitudinally adjacent paths.

31. A method of gas shielded arc welding steel rails each having a lower base, a vertically extending web and an upper head, said rails having laterally extending end faces longitudinally spaced apart to provide a base gap, a web gap and a head gap to be filled with steel to join said rails, said head gap comprising a transition portion and a full width portion and each said gap having laterally opposite ends, said method comprising the steps of filling said base gap, said web gap and said transition and full width portions of said head gap with a molten steel from a filler metal electrode by a gas shielded electrode arc welding process, said filling said transition portion of head gap including holding said electrode for a preselected period of time at a first location adjacent one of said laterally opposite ends of the head gap and then moving the electrode laterally from said first location to a second location adjacent the other of said laterally opposite ends of the head gap to lay a first bead of filler metal having a first end at said one of said opposite ends and a second end spaced from said one end in the direction toward the other of said opposite ends, said first bead having a vertical thickness which is greater at said first end thereof than at said second end thereof, holding said electrode at said second location for a preselected period of time and then moving the electrode longitudinally from said second location to a third location adjacent said other of said opposite ends, holding said electrode at said third location for a preselected period of time and then moving said electrode laterally from said third location to a fourth location adjacent said one end of the head gap to lay a second bead of filler metal having a first end at said other of said opposite ends and a second end spaced from said other end in the direction toward said one of said opposite ends, said second bead having a vertical thickness which is greater at said first end thereof than at said second end thereof, holding said electrode at said fourth location for a preselected period of time and then moving said electrode longitudinally from said fourth location to said first location, and then repeating the steps of laying said first and second beads of filler metal until said transition portion of said head gap is filled.

32. The method according to claim 31, wherein said filling said full width portion of said head gap includes holding said electrode for a preselected period of time at said first location and then movng the electrode laterally from said first location to said second location, holding said electrode at said second location for a preselected period of time and then moving the electrode catercorner from said second location to said fourth location, holding said electrode at said fourth location for a preselected period of time and then moving said electrode laterally from said fourth location to said third location, holding said electrode at said third location for a preselected period of time and then moving said electrode catercorner from said third location to said first location, and then repeating the steps of moving said electrode between said first, second, fourth, and third locations until said full width portion of said head gap is filled.

33. The method according to claim 32, wherein said preselected period of time is between 0.1 and 1.0 seconds.

34. The method according to claim 33, wherein said electrode is moved between said first, second, third, and fourth locations and between said first, second, fourth, and third locations at a preselected speed of up to 30 inches per second.

35. The method according to claim 34, further including the step of oscillating said electrode laterally with respect to the direction of movement of said electrode between the first, second, third, and fourth locations and between said first, second, fourth, and third locations.

36. The method according to claim 35, further including the step of vertically feeding said electrode at a feed rate varying from 100 to 320 inches per minute.

37. The method according to claim 32, wherein said electrode is moved between said first, second, third, and fourth locations and between said first, second, fourth, and third locations at a preselected speed of up to 30 inches per second.

38. The method according to claim 37, further including the step of oscillating said electrode laterally with respect to the direction of movement of said electrode between the first, second, third, and fourth locations and between said first, second fourth, and third locations.

39. The method according to claim 38, further including the step of vertically feeding said electrode at a feed rate varying from 100 to 320 inches per minute.

40. The method according to claim 32, further including the step of oscillating said electrode laterally with respect to the direction of movement of said electrode between the first, second, third, and fourth locations.

41. The method according to claim 40, wherein said preselected period of time is between 0.1 and 1.0 seconds.

42. The method according to claim 41, further including the step of vertically feeding said electrode at a feed rate varying from 100 to 320 inches per minute.

43. The method according to claim 32, wherein said filling of said transition and full width portions of said head gap is by a pulsed arc welding process.

44. The method according to claim 43, wherein said filling of said base gap comprises the steps of laying a root pass of molten steel in said base gap by a spray transfer arc welding process, laying a second layer of molten steel in said base gap in part by a pulsed arc welding process and in part by a spray transfer arc welding process, and filling the remainder of said base gap with molten steel by a pulsed arc welding process.

45. The method according to claim 44, wherein said base gap has laterally opposite ends and said laying of said root pass comprises moving said electrode along a path from one of said opposite ends toward the other, and said laying of said second layer comprises moving said electrode along a substantially rectangular path having laterally extending sides between said opposite ends of said gap, said path having beginning and ending ends, and sequentially laying a first portion of said second layer from said beginning end to a location spaced from said ending end by a pulsed arc process and laying a second portion from said location to said ending end by a spray transfer arc welding process.

46. The method according to claim 45, wherein said location is about midway between beginning and said ending ends of said path.

47. The method according to claim 45, and filling said web gap with molten steel by a pulsed arc welding process.

48. The method according to claim 47, wherein the filling of the remainder of said base gap comprises continuously moving said electrode along rectangular paths having laterally extending sides and longitudinally extending ends between said sides, and wherein said filling of said web gap comprises moving said electrode in longitudinally opposite directions therein.

49. The method according to claim 48, and oscillating said electrode laterally with respect to the direction of movement thereof in said base gap, web gap and head gap.

50. A method of gas shielded arc welding steel rails each having a base, a vertically extending web and an upper head, said rails having laterally extending end faces longitudinally spaced apart to provide a base gap, a web gap and a head gap to be filled with molten steel from a filler metal electrode by a gas shielded electric arc process to join said rails, said base gap having a bottom portion and a top portion joining said web gap, said method comprising the steps of laying a root pass of molten steel in said base gap by a spray transfer arc welding process, laying a second layer of molten steel in said base gap in part by a pulsed arc welding process and in part by a spray transfer arc welding process, and filling the remainder of said base gap, said web gap and said head gap with molten steel by a pulsed arc welding process.

51. The method according to claim 50, wherein said base gap has laterally opposite ends and said laying of said root pass comprises moving said electrode along a path from one of said opposite ends toward the other, and said laying of said second layer comprises moving said electrode along a substantially rectangular path having laterally extending sides between said opposite ends of said gap.

52. The method according to claim 51, and sequentially laying a first portion of said second layer along one side of said rectangular path by a pulsed arc process and laying a second portion of said second layer along the other side of the rectangular path by a spray transfer arc welding process.

53. The method according to claim 52, wherein said other side of said substantially rectangular path extends midway between said base gap.

54. The method according to claim 51, wherein said filling of the remainder of said base gap comprises continuously moving said electrode along rectangular paths having laterally extending sides and longitudinally extending ends between said sides, said filling of said web gap comprises moving said electrode in longitudinally opposite directions therein, and said filling of said head gap comprises continuously moving said electrode along rectangular first paths having first laterally extending sides and longitudinally extending ends between said first sides and then along second paths having second laterally extending sides and catercorner path portions betwen said second sides.

55. The method according to claim 54, wherein said first and second paths have corners between adjacent ones of said first sides and said ends, and between adjacent ones of said second sides and said catercorner path portions, and delaying movement of said electrode at each said corner for a preselected period of time.

56. The method according to claim 55, wherein said preselected period of time is from 0.1 to 1.0 seconds.

57. The method according to claim 56, further including the step of oscillating said electrode laterally with respect to the direction of movement of said electrode along said first and second paths.

58. The method according to claim 57, further including the step of moving said electrode along said first and second paths at a rate of speed of up to 30 inches per minute.

59. The method according to claim 58, further including the step of oscillating said electrode laterally with respect to the direction of movement of said electrode along said first and second paths.

60. The method according to claim 55, further including the step of oscillating said electrode laterally with respect to the direction of movement of said electrode along said first and second paths.

61. The method according to claim 54, further including the step of moving said electrode along said first and second paths at a rate of speed of up to 30 inches per minute.

62. The method according to claim 54, including the further step of feeding said electrode vertically at a feed rate varying from 100 to 320 inches per minute with respect to the filling of the remainder of said base gap, said web gap and said head gap.

* * * * *